(12) United States Patent
Matsumoto et al.

(10) Patent No.: US 6,859,248 B2
(45) Date of Patent: Feb. 22, 2005

(54) LIQUID CRYSTAL DISPLAY DEVICE AND METHOD OF FABRICATING THE SAME WITH NON-PARALLEL CHEVRON SHAPED ELECTRODES

(75) Inventors: Kimikazu Matsumoto, Tokyo (JP); Shinichi Nishida, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 299 days.

(21) Appl. No.: 09/897,882

(22) Filed: Jul. 5, 2001

(65) Prior Publication Data

US 2002/0018166 A1 Feb. 14, 2002

(30) Foreign Application Priority Data

Jul. 5, 2000 (JP) ........................................ 2000-203559

(51) Int. Cl.[7] ............................................ G02F 1/1343
(52) U.S. Cl. ....................................................... 349/141
(58) Field of Search .......................................... 349/114

(56) References Cited

U.S. PATENT DOCUMENTS 6,137,557 A * 10/2000 Hebiguchi et al. .......... 349/141
6,222,599 B1 * 4/2001 Yoshida et al. ............. 349/106
6,266,116 B1 * 7/2001 Ohta et al. .................. 349/141

FOREIGN PATENT DOCUMENTS

| JP | A 7-134301 | 5/1995 |
|----|------------|--------|
| JP | A 7-191336 | 7/1995 |
| JP | A 7-234414 | 9/1995 |
| JP | A 8-29812 | 2/1996 |
| JP | A 9-105908 | 4/1997 |
| JP | A 9-258269 | 10/1997 |
| JP | A 9-311334 | 12/1997 |
| JP | A 10-3092 | 1/1998 |
| JP | A 10-142635 | 5/1998 |
| JP | A 10-148826 | 6/1998 |
| JP | A 10-186329 | 7/1998 |
| JP | A 10-206866 | 8/1998 |
| JP | A 11-30784 | 2/1999 |
| JP | A 11-119248 | 4/1999 |
| JP | A 11-194353 | 7/1999 |
| JP | A 2001-33814 | 2/2001 |
| JP | A 2001-33815 | 2/2001 |
| WO | 01/18597 A1 | 3/2001 |

* cited by examiner

Primary Examiner—Frank G. Font
Assistant Examiner—Timothy Rude
(74) Attorney, Agent, or Firm—Young & Thompson

(57) ABSTRACT

An in-plane switching type liquid crystal display device includes (a) a first substrate on which a plurality of gate lines and a plurality of data lines are formed such that the gate lines are substantially perpendicular to the data lines, and on which at least one pixel electrode and at least one common electrode are alternately formed in each of pixels defined by the gate and data lines, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate. Both the pixel electrode and the common electrode have at least one bending point at which the pixel electrode and the common electrode bend, and are designed to bend such that both an intensity and a direction of a field generated by the voltage successively vary.

5 Claims, 25 Drawing Sheets

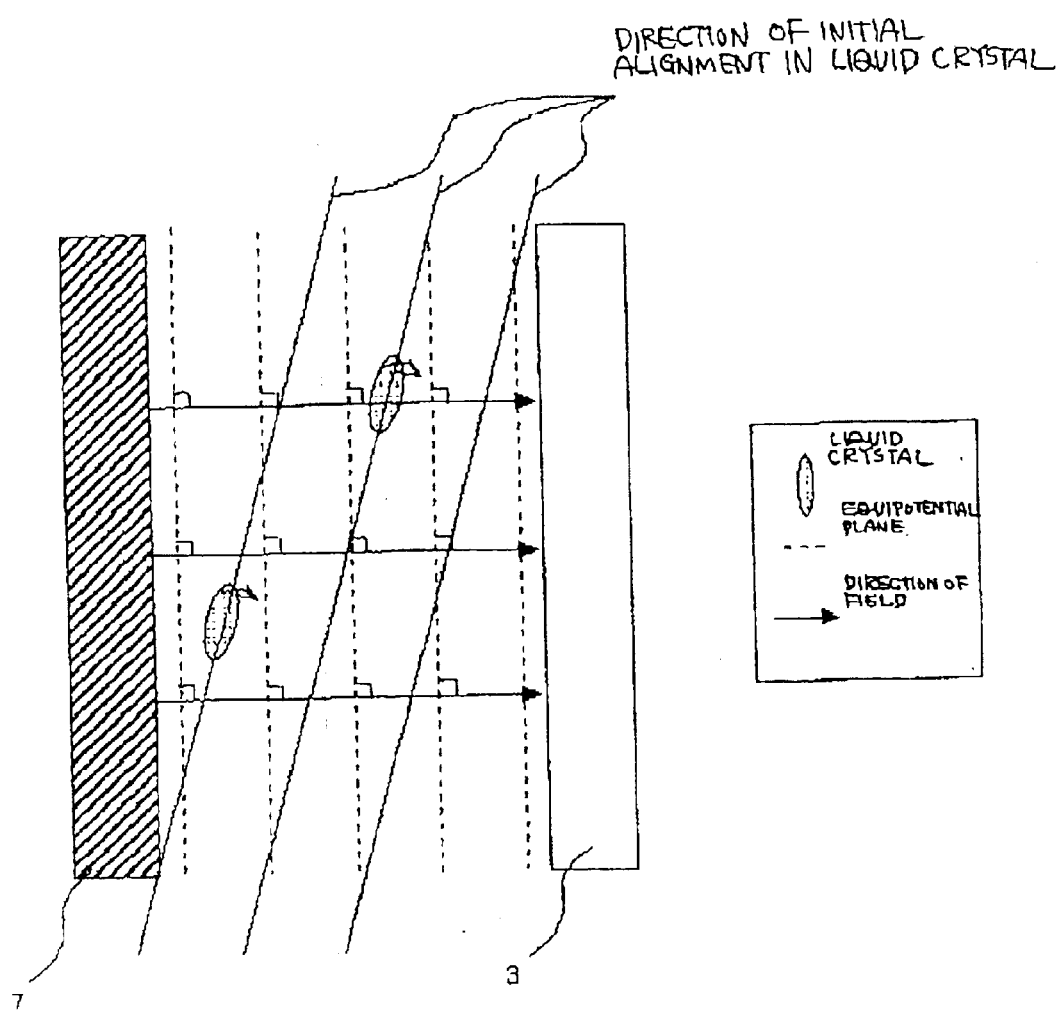

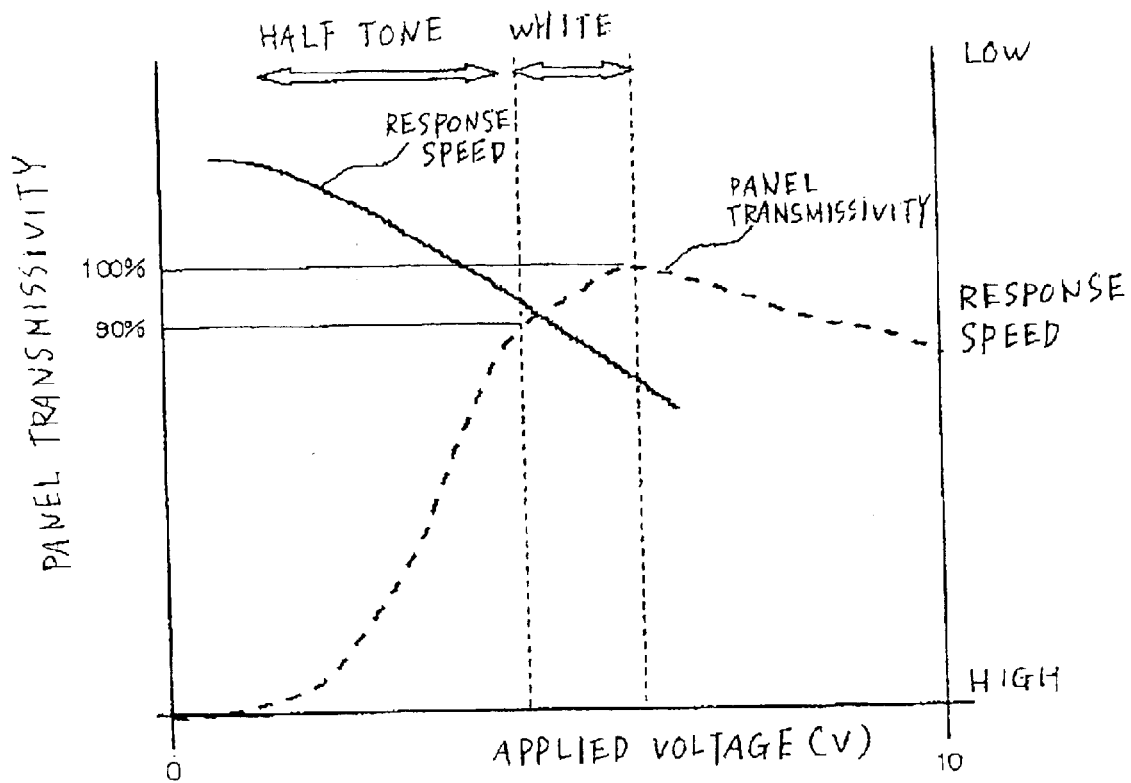

FIG. 8
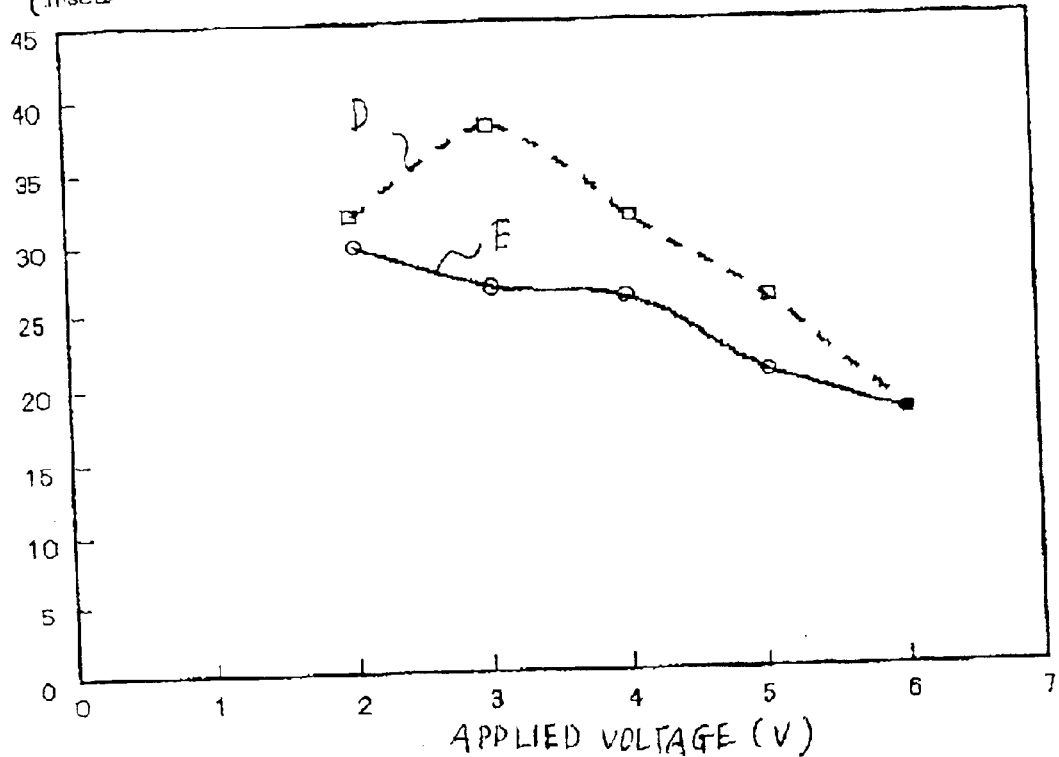
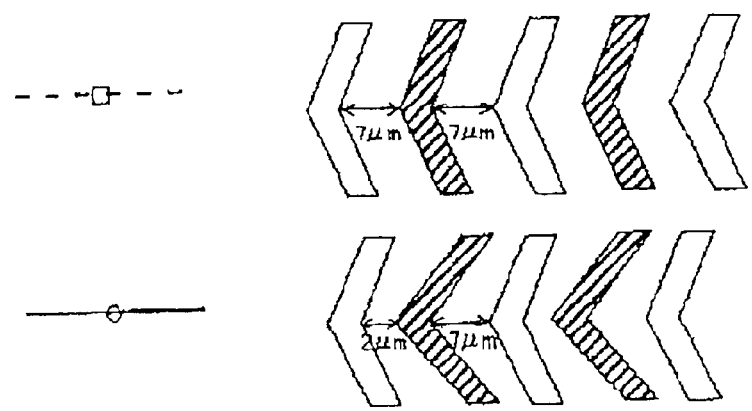

DIRECTION OF INITIAL ALIGNMENT IN LIQUID CRYSTAL. (RUBBING DIRECTION)

16a; 偏光板

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

DIRECTION OF INITIAL ALIGNMENT IN LIQUID CRYSTAL (RUBBING DIRECTION)

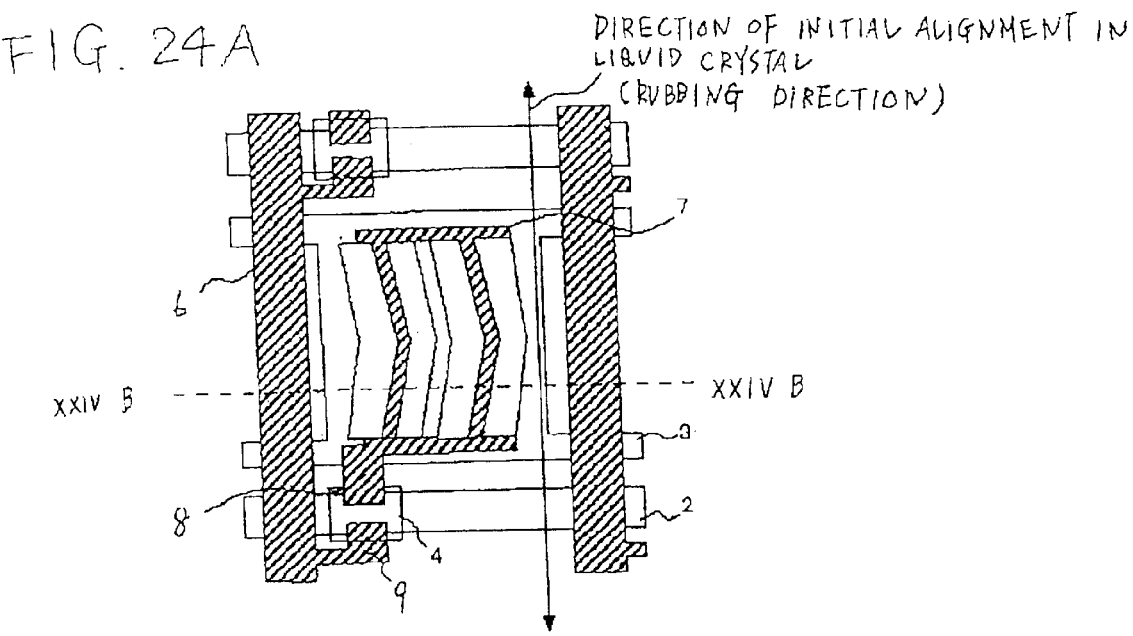

DIRECTION OF INITIAL ALIGNMENT IN LIQUID CRYSTAL (RUBBING DIRECTION)

LIQUID CRYSTAL DISPLAY DEVICE AND METHOD OF FABRICATING THE SAME WITH NON-PARALLEL CHEVRON SHAPED ELECTRODES

BACKGROUND OF THE INVENTION

1. Field of the Invention

The invention relates to a liquid crystal display device and a method of fabricating the same, and more particularly to an in-plane switching type liquid crystal display device in which a voltage applied across a pixel electrode and a common electrode both formed on a thin film transistor (TFT) substrate causes liquid crystal to rotate in a plane substantially in parallel with the substrate, and a method of fabricating the same.

2. Description of the Related Art

An active matrix type liquid crystal device including a thin film transistor (hereinafter, abbreviated as "TFT") as a device for switching a pixel provides high image quality, and hence, is currently widely used, for instance, as a monitor display of a desk-top type computer.

An operation mode of a liquid crystal display is generally grouped into a twisted nematic mode in which aligned liquid crystal molecules are rotated such that directors thereof are directed in a direction perpendicular to a glass substrate, and an in-plane switching hereinafter, abbreviated as "IPS") type liquid crystal display device in which aligned liquid crystal molecules are rotated such that directors thereof are directed in a direction parallel with a glass substrate.

In IPS liquid crystal display device, pixel electrodes and common electrodes are formed in parallel with each other on a first transparent substrate on which TFT is also fabricated. A voltage is applied across the pixel and common electrodes to thereby generate a field in parallel with the substrate. Directors of liquid crystal molecules are rotated in accordance with the thus generated field, and as a result, it is possible to control an amount of light passing through a liquid crystal layer.

Accordingly, since directors are rotated in a plane in parallel with a substrate in the IPS liquid crystal display device., the IPS liquid crystal display device will not be accompanied with a problem unlike TN type liquid crystal display device that a relation between an amount of light passing through a liquid crystal layer and a voltage applied across a pixel electrode and a common electrode is not uniform between a case wherein the device is viewed from the directors and a case wherein the device is viewed from a direction of a normal line of the substrate. As a result, the IPS liquid crystal display device ensures high quality images in a wide visual angle.

In the IPS liquid crystal display device, a liquid crystal layer is in homogenous alignment, and is sandwiched between two polarizing plates having polarizing axes perpendicular to each other. One of the polarizing axes is directed in an alignment direction of liquid crystal molecules. Thus, in general, when no voltage is applied across a pixel electrode and a common electrode, a display screen displays black, whereas when a voltage is applied across a pixel electrode and a common electrode, liquid crystal molecules are twisted in accordance with a field, to thereby cause a display screen to display white. The IPS liquid crystal display device is widely used, because it can stably keep a brightness low when a display screen displays black.

However, the conventional IPS liquid crystal display device is accompanied with a problem, as illustrated in FIG. 1, that since a pixel electrode 7 and a common electrode 3 are both formed in the form of a line, and liquid crystal molecules are rotated only in a single direction, a display screen is colored when the display screen is obliquely viewed while the display screen displays white.

In order to solve the problem, Japanese Unexamined Patent Publication No. 9-311334 has suggested a liquid crystal display device in which the pixel electrode 7 and the common electrode 3 are designed to be bent in the form of "<" in a pixel.

FIG. 2A is a plan view of the liquid crystal display device suggested in the above-mentioned Publication, and FIG. 2B is a cross-sectional view taken along the line IIB—IIB in FIG. 2A.

The illustrated liquid crystal display device is comprised of a first transparent substrate 1 on which a thin film transistor (TFT) is fabricated, a second transparent substrate 11 on which a color filter is formed, and a liquid crystal layer 17 sandwiched between the first and second transparent substrates 1 and 11.

Gate electrodes 2 and data lines 6 are formed on the first transparent substrate 1 such that they are substantially perpendicular to each other, and TFTs 4 are fabricated in a matrix at intersections of the gate electrodes 2 and the data lines 6. In each of pixels, pixel electrodes 7 and common electrodes 3 are alternately formed in parallel with each other. The pixel electrodes 7 and the common electrodes 3 are designed to have a bending point at which the pixel electrodes 7 and the common electrodes 3 are bent in the form of "<".

On the second transparent substrate 11 are formed a black matrix layer 12 for interrupting a light to pass therethrough, a color layer 13 for displaying red, green and blue (RGB) colors, and a planarizing film 14 which covers the black matrix layer 12 and the color layer 13 therewith and has a planarized surface.

Alignment films 18 are coated on surfaces of the first and second transparent substrates 1 and 11 such that the liquid crystal layer 17 is sandwiched between the alignment films 18. Liquid crystal in the liquid crystal layer 17 is homogeneously aligned substantially in parallel with a direction in which the data lines 6 extend.

A polarizing plate 16a is adhered to an outer surface of the first transparent substrate 1, and a polarizing plate 16b is adhered to an outer surface of the second transparent substrate 11. The polarizing plates 16a and 16b have polarizing axes perpendicular to each other, and one of the polarizing axes is set in parallel with a direction in which liquid crystal molecules are aligned.

By applying a voltage to the pixel electrode 7 through TFT 4 to thereby establish a horizontal field between the pixel electrode 7 and the common electrode 3, liquid crystal in the liquid crystal layer 17 are twisted in a plane parallel with the first and second transparent substrates 1 and 11, to thereby control display.

In the liquid crystal display device illustrated in FIGS. 2A and 2B, when a voltage is applied across the pixel electrode 7 and the common electrode 3, fields are generated in different directions from each other in two regions sandwiching the bending points of the pixel and common electrodes 7 and 3 therebetween, as illustrated in FIG. 4 with arrows X1 and X2, Accordingly, liquid crystal molecules in the liquid crystal layer 17 are twisted in two different directions. As a result, different colors can be seen in the two regions in a display screen when the display screen is obliquely viewed while the display screen displays white.

Since the colors compensate for each other, the above-mentioned different colors can be reduced.

As mentioned above, it is possible in the IPS liquid crystal display device to widen a visual angle and reduce color in a display screen by designing the pixel electrode 7 and the common electrode 3 in the form of "<". However, since it is necessary in the IPS liquid crystal display device to form both the pixel electrodes 7 and the common electrodes 3 such that a numerical aperture in a pixel is kept high, it would not be possible to arrange the pixel electrodes 7 and the common electrodes 3 in a high density, and hence, it would be also impossible to reduce a gap between adjacent electrodes. As a result, a greater voltage has to be applied across the pixel electrode 7 and the common electrode 3 in order to establish a field having a higher intensity, resulting in an increase in power consumption.

On the other hand, if a smaller voltage is applied across the pixel electrode 7 and the common electrode 3, a resultant field would have a smaller intensity, causing a problem that liquid crystal molecules in the liquid crystal layer 17 cannot quickly respond to the field.

One of solutions to this problem is to select liquid crystal molecules having a small viscosity. Such liquid crystal molecules make it possible to respond to a field when a display screen displays white. However, such liquid crystal molecules is accompanied with a problem that an effectively small field is applied to the liquid crystal layer 17 in half tone, and hence, the liquid crystal molecules responds to a field twice slower than a case in which a display screen displays white.

Hereinbelow is explained this problem with reference to FIG. 3. FIG. 3 illustrates a relation between a voltage applied to liquid crystal and both a transmissivity of a panel and a response. In FIG. 3, a broken line shows a relation between an applied voltage and a transmissivity of a panel, and a solid line shows a relation between an applied voltage and a response.

As illustrated in FIG. 3, as a voltage applied to liquid crystal increases, a direction in which liquid crystal is aligned is twisted towards a direction of a field, and resultingly, a light is more likely to pass through the liquid crystal layer 17. When a certain voltage is applied to the liquid crystal, the liquid crystal is twisted by 45 degrees, and the transmissivity is in maximum. Namely, a display screen displays white.

When a greater voltage is applied to the liquid crystal, the liquid crystal molecules can more readily rotates. Hence, as a greater voltage is applied to the liquid crystal, the liquid crystal can respond to a field more rapidly. Since a smaller voltage is applied to the liquid crystal in a half tone display state than in a white display state, the liquid crystal would respond to a field more slowly in a half tone display state than in a white display state.

In general, a threshold voltage Vth defined as a minimum voltage for driving liquid crystal is represented in accordance with the following equation (1).

$$Vth = \pi \times L/d \times (K22/\epsilon 0 \Delta \epsilon)^{1/2} \quad (1)$$

In the equation (1), L indicates a distance between the pixel electrode 7 and the common electrode 3, "d" indicates an effective cell gap, K22 indicates a twist elastic coefficient of liquid crystal existing in the liquid crystal layer 17, and $\Delta \epsilon$ indicates anisotropy in a dielectric constant.

As is obvious in the equation (1), the greater the distance L is, the smaller an intensity of a field is, and hence, the greater the threshold voltage Vth is. On the other hand, the greater the cell gap "d" is, more readily the liquid crystal can be made to rotate, and resultingly, the smaller the threshold voltage Vth is. Accordingly, in order to increase a response speed of the liquid crystal, it is necessary to reduce the distance L, and/or increase the cell gap "d".

However, though the threshold voltage Vth can be made smaller by uniformly narrowing the distance L between the pixel electrode 7 and the common electrode 3 or by uniformly increasing the cell gap "d", it would be still impossible to accomplish quick response in half tone when a small voltage is applied across the pixel electrode 7 and the common electrode 3.

In addition, if the distance L were made smaller, there would be caused a problem that the electrodes in a pixel would occupy a larger area, resulting in reduction in a numerical aperture.

SUMMARY OF THE INVENTION

In view of the above-mentioned problems in the conventional IPS liquid crystal display device, it is an object of the present invention to provide an in-plane switching type liquid crystal display device which is capable of accomplishing a quicker response in a half tone, and increasing a visual angle.

In one aspect of the present invention, there is provided an in-plane switching type liquid crystal display device including (a) a first substrate on which a plurality of gate lines and a plurality of data lines are formed such that the gate lines are substantially perpendicular to the data lines, and on which at least one pixel electrode and at least one common electrode are alternately formed in each of pixels defined by the gate and data lines, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, both the pixel electrode and the common electrode have at least one bending point at which the pixel electrode and the common-electrode bend, and both the pixel electrode and the common electrode are designed to bend such that both an intensity and a direction of a field generated by the voltage successively vary.

For instance, the pixel electrode and the common electrode may be designed to bend in the form of "<".

It is preferable that the pixel electrode and the common electrode are symmetrical in shape with each other about an axis extending through a center of the pixel in parallel with the gate line, and regions surrounded by the pixel and common electrodes located adjacent to each other have the same area.

For instance, the first substrate may be designed to further include an insulating film covering the pixel and common electrodes therewith, and the second substrate may be designed to include a black matrix layer having a pattern of opening, a color layer, and a planarizing film covering the black matrix layer and the color layer therewith and having a planarized surface, and at least one of the insulating film and the planarizing film may be formed with a recess having a predetermined cross-section such that a gap between the first and second substrates varies due to the recess.

For instance, the first substrate may be designed to further include a black matrix layer formed thereon and having a pattern of opening, a color layer formed thereon, an interlayer film a covering the black matrix layer and the color layer therewith, and an insulating film covering the pixel and common electrodes therewith, and at least one of the interlayer film and the insulating film may be formed with a recess having a predetermined cross-section such that a gap between the first and second substrates varies due to the recess.

For instance, the first substrate may be designed to further include a first alignment film formed thereon exposing to the liquid crystal layer, and the second substrate further includes a second alignment film formed thereon exposing to the liquid crystal layer, and the first and second alignment films are coated by off-set printing a material on the first and second substrates, the material having a viscosity equal to or greater than 30 cp.

There is further provided an in-plane switching type liquid crystal display device including (a) a first substrate on which a plurality of gate lines and a plurality of data lines are formed such that the gate lines are substantially perpendicular to the data lines, and on which at least one pixel electrode and at least one common electrode are alternately formed in each of pixels defined by the gate and data lines, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, both the pixel electrode and the common electrode have at least one bending point at which the pixel electrode and the common electrode bend by first and second bending angles, respectively, and the first bending angle is different from the second bending angle.

It is preferable that the first bending angle is different from the second bending angle by five degrees or greater.

There is still further provided an in-plane switching type liquid crystal display device including (a) a first substrate on which a plurality of gate lines and a plurality of data lines are formed such that the gate lines are substantially perpendicular to the data lines, and on which at least one pixel electrode and at least one common electrode are alternately formed in each of pixels defined by the gate and data lines, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, both the pixel electrode and the common electrode have at least one bending point at which the pixel electrode and the common electrode bend by first and second bending angles, respectively, and the pixel electrode and the common electrode bend in opposite directions from each other.

There is yet further provided an in-plane switching type liquid crystal display device including (a) a first substrate on which a plurality of gate lines and a plurality of data lines are formed such that the gate lines are substantially perpendicular to the data lines, and on which at least one pixel electrode and at least one common electrode are alternately formed in each of pixels defined by the gate and data lines, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, and at least one of the pixel electrode and the common electrode has a width varying in a direction in which the pixel electrode and the common electrode extend.

For instance, the width may be greatest at a center of the pixel electrode or the common electrode in a lengthwise direction thereof and may be smallest at opposite ends of the pixel electrode or the common electrode in a length-wise direction thereof.

For instance, the width may be smallest at a center of the pixel electrode or the common electrode in a length-wise direction thereof and may be greatest at opposite ends of the pixel electrode or the common electrode in a length-wise direction thereof.

There is still yet further provided an in-plane switching type liquid crystal display device including (a) a first substrate on which a plurality of gate lines and a plurality of data lines are formed such that the gate lines are substantially perpendicular to the data lines, and on which at least one pixel electrode and at least one common electrode are alternately formed in each of pixels defined by the gate and data lines, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, both the pixel electrode and the common electrode have M bending points at which the pixel electrode and the common electrode bend, the M being an odd number equal to or greater than 5.

There is further provided an in-plane switching type liquid crystal display device including (a) a first substrate including (a1) a plurality of gate lines and a plurality of data lines formed thereon such that the gate lines are substantially perpendicular to the data lines. (a2) at least one pixel electrode and at least one common electrode alternately formed thereon in each of pixels defined by the gate and data lines, and (a3) an insulating film covering the pixel and common electrodes therewith, (b) a second substrate facing the first substrate, and including (b1) a black matrix layer having a pattern of opening, (b2) a color layer, and (b3) a planarizing film covering the black matrix layer and the color layer therewith and having a planarized surface, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, and at least one of the insulating film and the planarizing film is formed with a recess having a predetermined cross-section such that a gap between the first and second substrates varies due to the recess.

It is preferable that the recess extends passing through a center of the pixel in parallel with the gate line, and regions in which the gap is different from each other are located symmetrically with each other about a line defined by a summit of the recess.

It is preferable that the recess is formed such that a line defined by a summit of the recess extends in a direction in which the pixel electrode or the common electrode extends.

It is preferable that at least one of the insulating film and the planarizing film is formed with a plurality of the recesses extending in parallel with one another.

For instance, the recess may be designed to have a cross-section which is semi-circular, U-shaped, V-shaped, trapezoidal, or rectangular.

There is further provided an in-plane switching type liquid crystal display device including (a) a first substrate including (a1) a black matrix layer formed thereon and having a pattern of opening, (a2) a color layer formed thereon, (a3) a plurality of gate lines and a plurality of data lines formed thereon such that the gate lines are substantially perpendicular to the data lines, (a4) at least one pixel electrode and at least one common electrode alternately formed thereon in each of pixels defined by the gate and data lines, (a5) an interlayer film covering the black matrix layer and the color layer therewith, and (a6) an insulating film covering the pixel and common electrodes therewith, (b) a second substrate facing the first substrate, and (c) a liquid crystal layer sandwiched between the first and second substrates, wherein when a voltage is applied across the pixel electrode and the common electrode, liquid crystal existing on extensions of the data lines are caused to rotate in a plane substantially in parallel with the first substrate, and at least one of the interlayer film and the insulating film is formed with a recess having a predetermined cross-section such that a gap between the first and second substrates varies due to the recess.

The color layer may be comprised of a plurality of sub-layers which separate from one another, the pixel and common electrodes are formed in a common layer to the color layer such that spaces formed between the sub-layers are filled with the pixel and common electrodes, and a difference in a thickness among the pixel electrode, the common electrode and color layer defines the recess.

It is preferable that the recess is formed such that a line defined by a summit of the recess extends in a direction in which the pixel electrode or the common electrode extends.

It is preferable that at least one of the insulating film and the planarizing film is formed with a plurality of the recesses extending in parallel with one another.

In another aspect of the present invention, there is provided a method of fabricating the above-mentioned liquid crystal display device, including the steps of (a) forming the planarizing or interlayer film composed of a material which is cured when ultra-violet ray is radiated thereto, and (b) locally radiating ultra-violet ray to the planarizing or interlayer film to thereby form the recess.

It is preferable that the material is a resin composed of resist or polyimide, and the ultra-violet ray is radiated to the planarizing or interlayer film through a ultra-violet ray cut filter The advantages obtained by the aforementioned present invention will be described hereinbelow.

The first advantage is that regions having threshold voltages from a small voltage to a high voltage can be formed successively in a pixel by varying bending angles of the pixel and common electrodes to thereby vary a gap between the pixel and common electrodes, or by forming TFT substrate or an opposing substrate with a recess to thereby vary a cell gap between the substrates. As a result, it would be possible to ensure a high panel transmissivity even in a half tone in which a low voltage is applied to crystal liquid, in a region in which a threshold voltage is small, and also possible to ensure a quick response of liquid crystal with the result of improvement in characteristics in displaying in a half tone.

The second advantage is that it would be possible to successively change a direction of a field applied to liquid crystal to thereby cause the liquid crystal to be twisted in a desired direction, by varying bonding angles of the pixel and common electrodes. This ensures significant enhancement in a characteristic of a visual angle, and accomplishes a liquid crystal display device having no dependency on a direction in which the device is seen.

The third advantage is that it would be possible to enhance OFF characteristic of liquid crystal by designing the pixel and common electrodes to have a plurality of bending points to thereby make it easy for liquid crystal to return to initial alignment condition by virtue of elastic force of liquid crystal.

The above and other objects and advantageous features of the present invention will be made apparent from the following description made with reference to the accompanying drawings, in which like reference characters designate the same or similar parts throughout the drawings,

BRIEF DESCRIPTION OF THE DRAWINGS

FIG. 1 illustrates a direction of a field in a conventional liquid crystal display device.

FIG. 3 illustrates a relation between an applied voltage and both a panel transmissivity and a response of liquid crystal in a conventional liquid crystal display device.

FIG. 8 illustrates a relation between an applied voltage and a response of liquid crystal in the liquid crystal display device in accordance with the first embodiment of the present invention.

FIG. 24A is a plan view of a liquid crystal display device in accordance with the ninth embodiment of the present invention.

FIG. 24B is a cross-sectional view taken along the line XXIVB—XXIVB in FIG. 24A.

DESCRIPTION OF THE PREFERRED EMBODIMENTS

Preferred embodiments in accordance with the present invention will be explained hereinbelow with reference to drawings.

[First Embodiment]

Figure 2A:
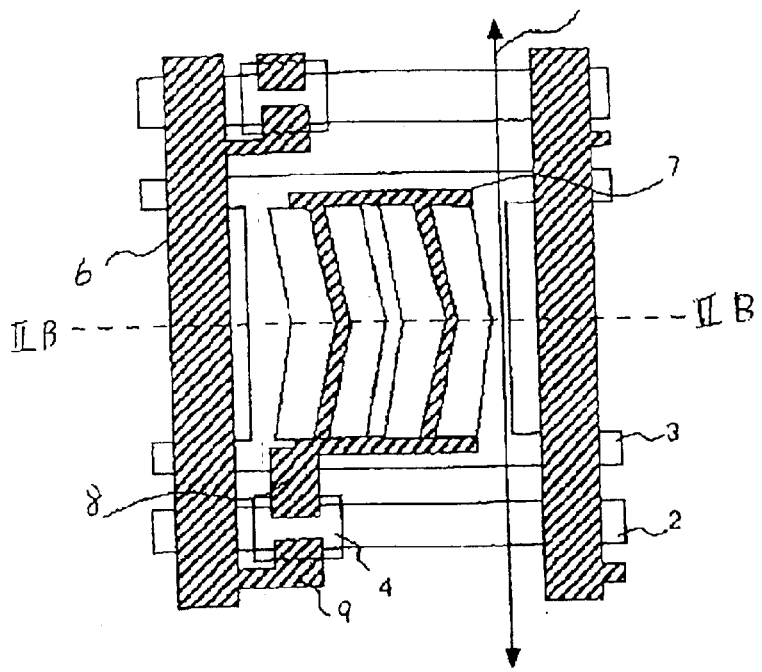
FIG. 2A is a plan view of a conventional liquid crystal display device.
Figure 2B:
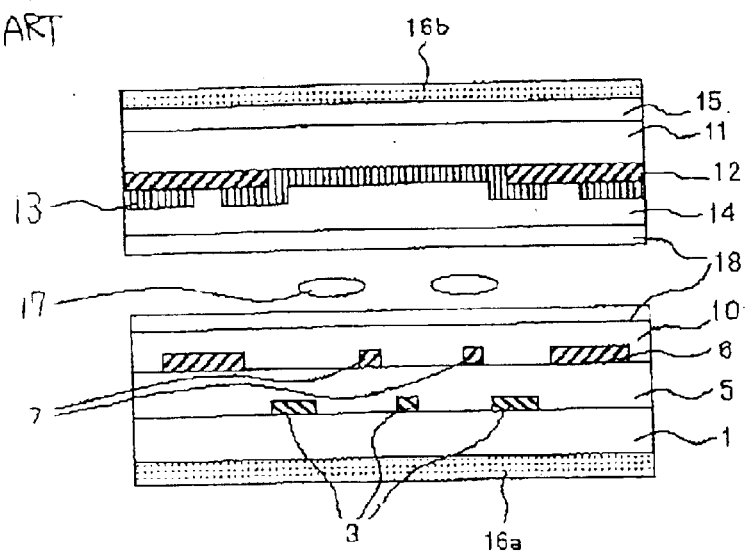
FIG. 2B is a cross-sectional view taken along the line IIB—IIB in FIG. 2A.
Figure 4:
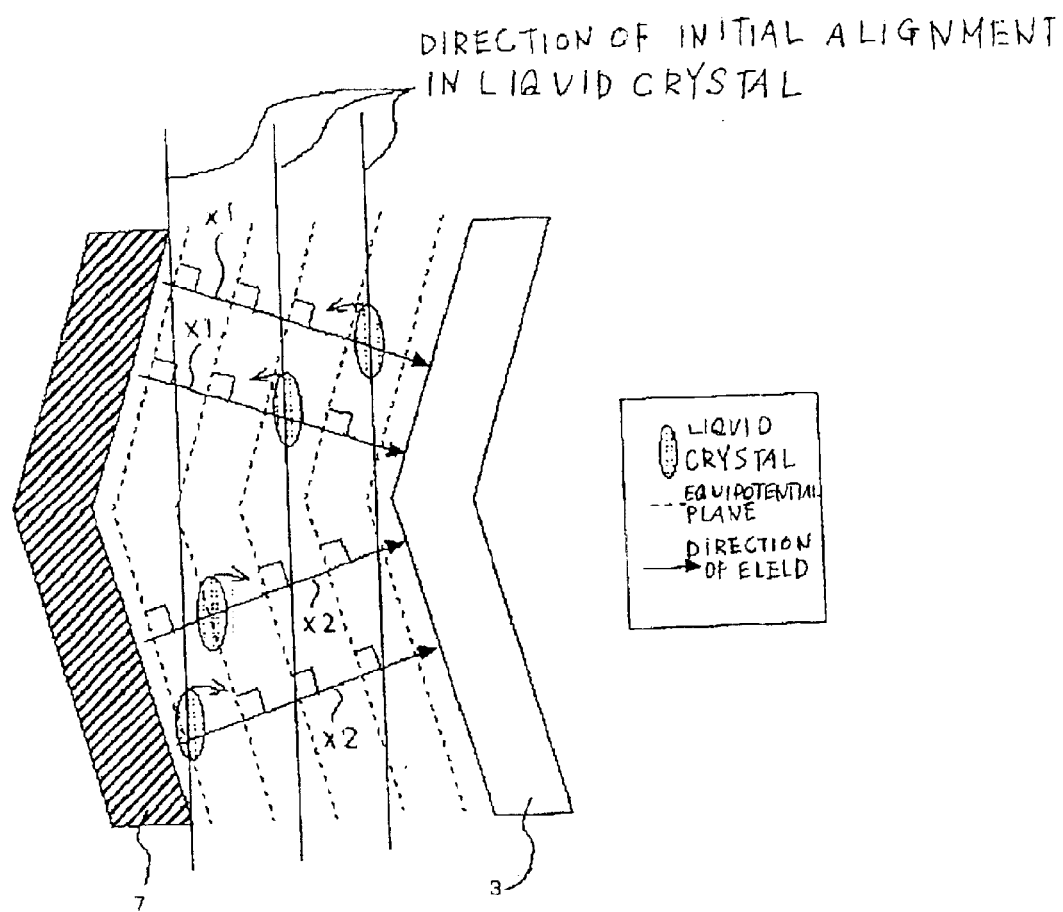
FIG. 4 illustrates a direction of a field in a conventional liquid crystal display device.
Figure 5A:
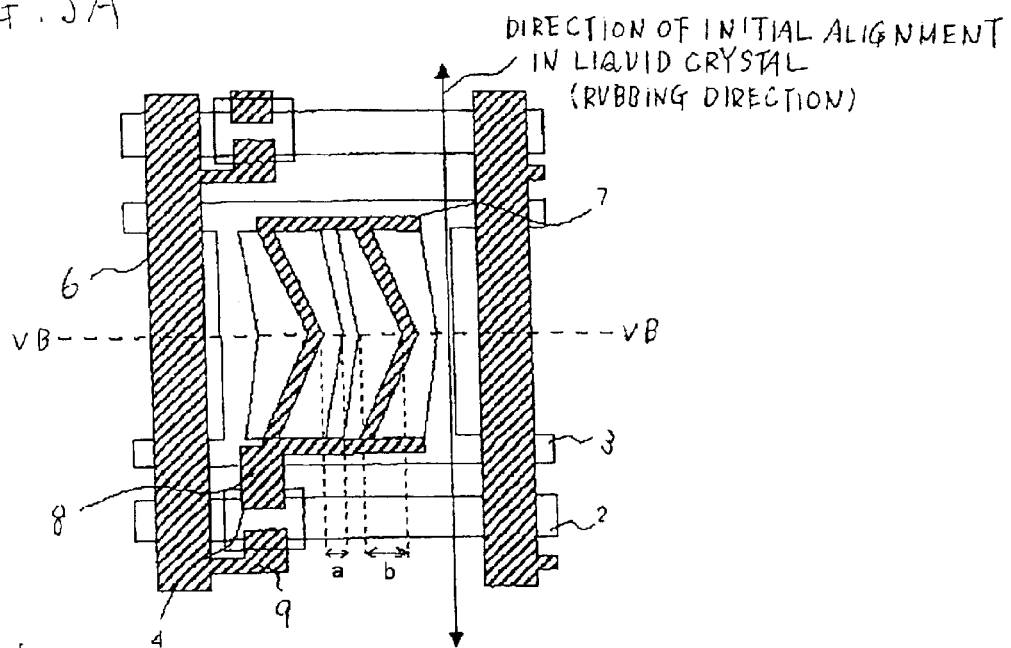
FIG. 5A is a plan view of a liquid crystal display device in accordance with the first embodiment of the present invention.
Figure 6:
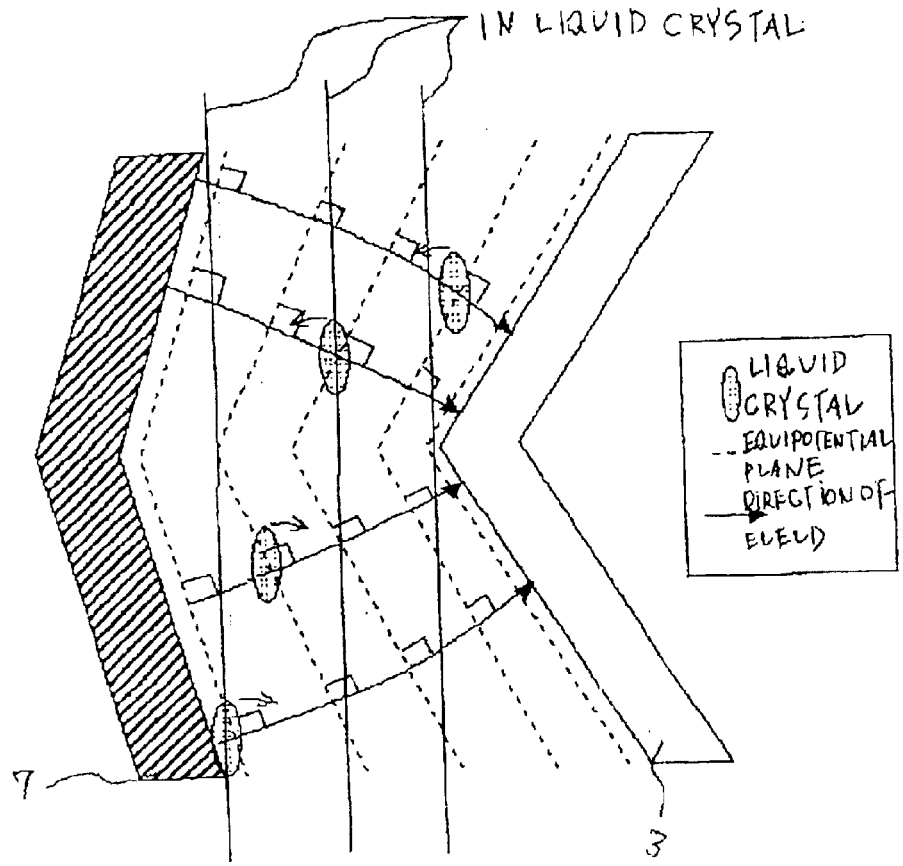
FIG. 6 illustrates a direction of a field in the liquid crystal display device in accordance with the first embodiment of the present invention.
Figure 7:
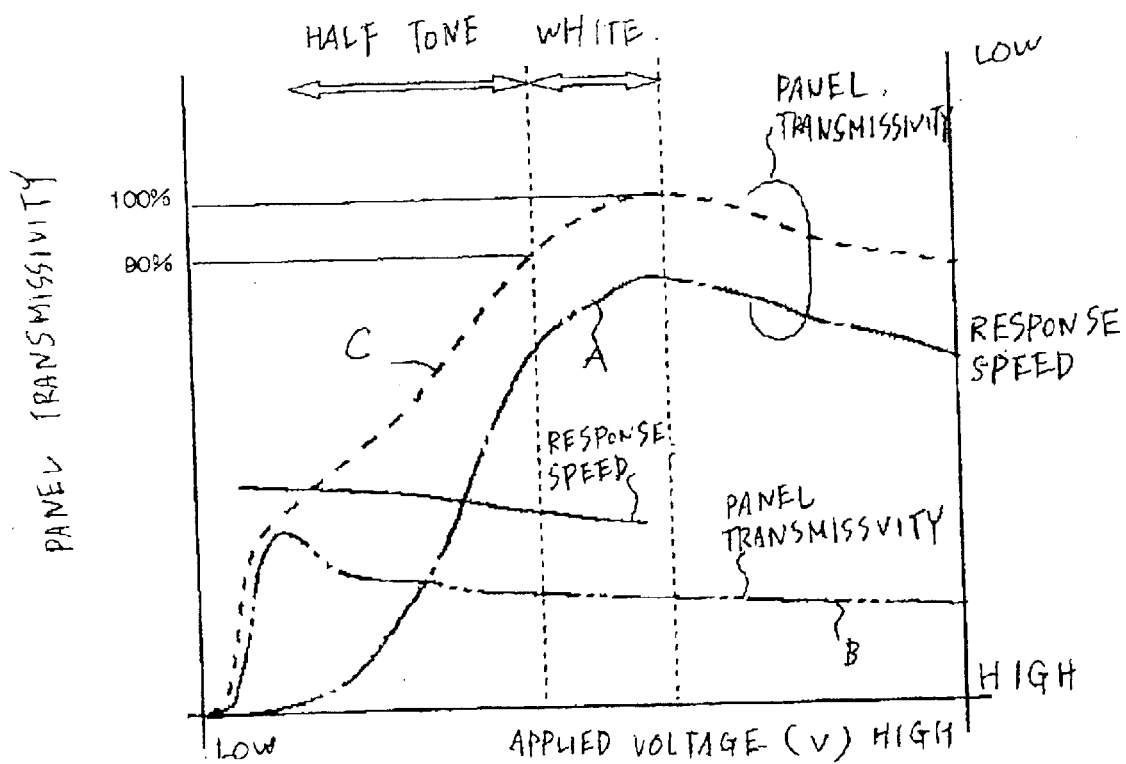
FIG. 7 illustrates a relation between an applied voltage and both a panel transmissivity and a response of liquid crystal in the liquid crystal display device in accordance with the first embodiment of the present invention.
Figure 9:
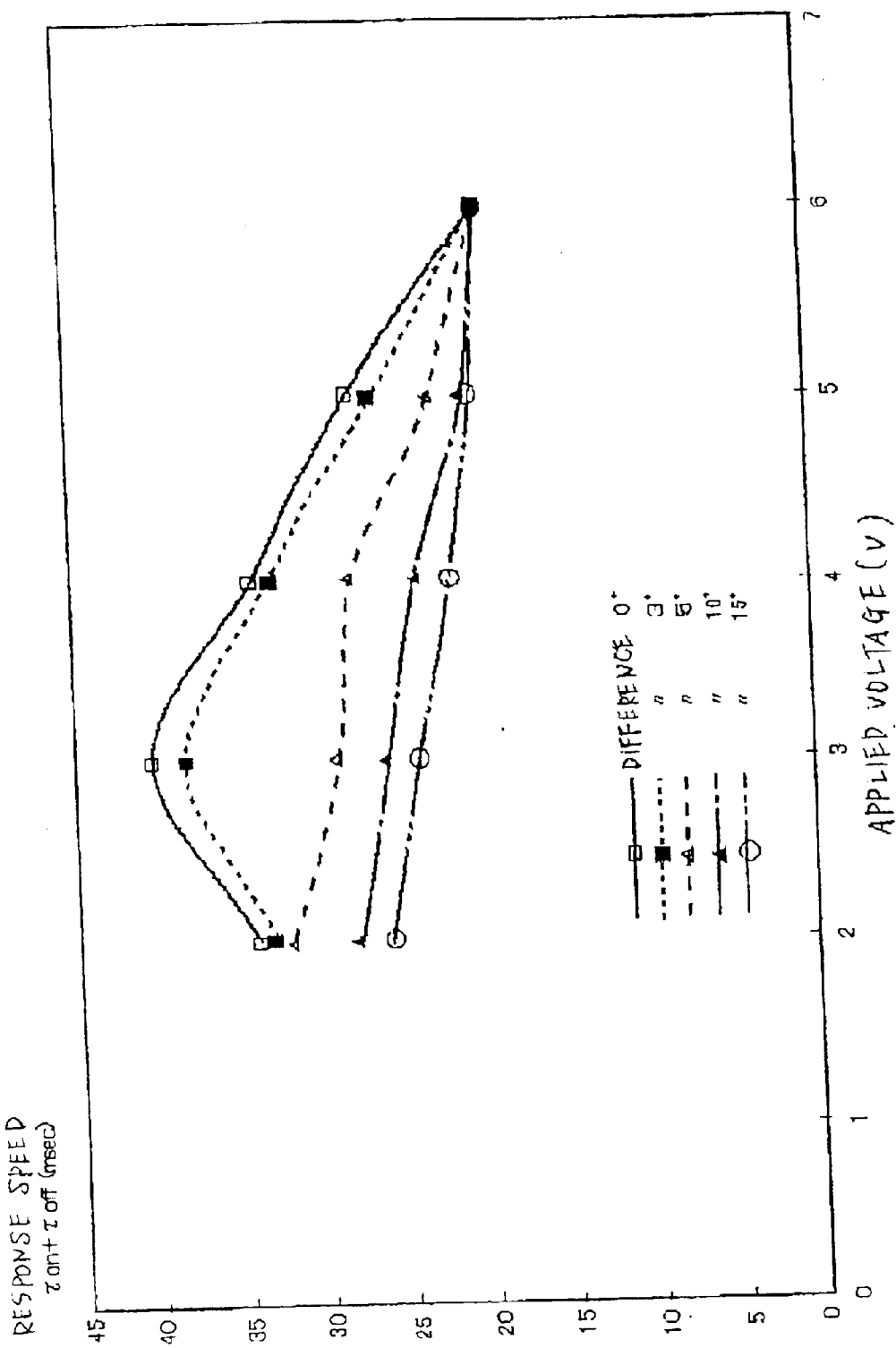
FIG. 9 illustrates a relation between a difference between bending angles of the electrodes and a response of liquid crystal in the liquid crystal display device in accordance with the first embodiment of the present invention.

FIGS. 1 to 5 illustrate an in-plane switching (IPS) type liquid crystal display device in accordance with the first embodiment. FIG. 5A is a plan view of the liquid crystal display device in accordance with the first embodiment, and FIG. 5B is a cross-sectional view taken along the line VB—VB in FIG. 5A. FIG. 6 illustrates a direction of a field and an equipotential surface of a voltage to be applied across a pixel electrode and a common electrode, in the liquid crystal display device in accordance with the first embodiment. FIG. 7 illustrates a relation between an applied voltage and both a panel transmissivity and a response of liquid crystal the first embodiment. FIG. 8 illustrates a relation between an applied voltage and a response of liquid crystal in the first embodiment FIG. 9 illustrates a relation between a difference between bending angles of the electrodes and a response of liquid crystal in first embodiment.

The IPS type liquid crystal display device in accordance with the first embodiment is comprised of a first transparent substrate 1 on which a thin film transistor (TFT) is to be fabricated, a second transparent substrate 11, and a liquid crystal layer 17 sandwiched between the first and second transparent substrates 1 and 11.

Gate electrodes 2 and data lines 6 are formed on the first transparent substrate 1 such that they are substantially perpendicular to each other. TFTs 4 are arranged in a matrix at intersections of the gate electrodes 2 and the data lines 6. Adjacent gate electrodes 2 spaced away from and in parallel with each other, adjacent data lines 6 spaced away from and in parallel with each other, and TFT 4 define one pixel.

In each of pixels, pixel electrodes 7 and common electrodes 3 are formed. Both the pixel electrodes 7 and the common electrodes 3 have a bending point at which they are bent in the form of ">". The pixel electrodes 7 are electrically connected to a source electrode 8 of TFT 4, and the common electrodes 3 are electrically connected to a common electrode line (not illustrated) extending in parallel with the gate electrodes 2.

Figure 5B:
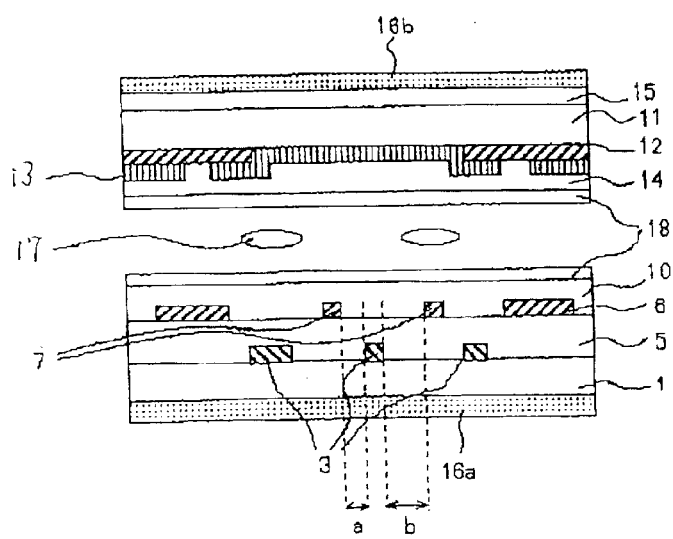
FIG. 5B is a cross-sectional view taken along the line VB—VB in FIG. 5A.

As illustrated in FIG. 5B, the common electrodes 3 are formed directly on the first transparent substrate 1. An interlayer insulating film 5 is formed on the first transparent substrate 1, covering the common electrodes 3 therewith. The data lines 6 and the pixel electrodes 7 are formed on the interlayer insulating films 5. A passivation film 10 is formed on the interlayer insulating film 5, covering the data lines G and the pixel electrodes 7 therewith. An alignment film 18 is formed on the passivation film 10.

A first polarizing plate 16a is adhered to a lower surface of the first transparent substrate 1.

On the second transparent substrate 11 are formed a black matrix layer 12 preventing a light from reaching the gate electrodes 2, the data lines 6, and a region between a pixel display area and both the gate electrodes 2 and the data lines 6, a color layer 13 for displaying red, green and blue (RGB) colors, a planarizing film 14 covering the black matrix layer 12 and the color layer 13 therewith and having a planarized surface, and an alignment film 18, in this order An electrically conductive layer 15 and a second polarizing plate 16b are formed on an upper surface of the second transparent substrate 11 in this order.

Liquid crystal in the liquid crystal layer 17 sandwiched between the first and second transparent substrates 1 and 11 is homogeneously aligned substantially in parallel with a direction in which the data lines 6 extend.

The first and second polarizing plates 16a and 16b have polarizing axes perpendicular to each other. One of the polarizing axes is set to be in parallel with a direction in which the liquid crystal is aligned.

A common voltage is applied to all the common electrodes 3 through the common electrode wire. A voltage is applied to the pixel electrodes 7 through TFT 4 to thereby establish a horizontal field between the pixel electrodes 7 and the common electrodes 3, thereby causing liquid crystal molecules in the liquid crystal layer 17 to be twisted in a plane parallel with the substrates 1 and 11, for controlling display.

As mentioned earlier, in the conventional IPS type liquid crystal display device, the pixel and common electrodes 7 and 3 are designed to bend in the form of "<" such that a field generated between the pixel and common electrodes 7 and 3 has two directions, in order to prevent a display screen from being colored when obliquely viewed while the display screen displays white. In the IPS type liquid crystal display device, a bending angle of the pixel electrodes 7 and a bending angle of the common electrodes 3 are designed to be different from each other such that a space between the pixel electrodes 7 and the common electrodes 3 varies in a pixel. In the first embodiment, a smallest space between the pixel electrodes 7 and the common electrodes 3 is set equal to about 2 μm, and a greatest space between the pixel electrodes 7 and the common electrodes 3 is set equal to about 7 μm which is equal to a space between the pixel and common electrodes in the conventional liquid crystal display device.

Specifically, as illustrated in FIGS. 5A, 5B and 6, the pixel electrodes 7 are designed to have a greater bending angle than that of the common electrodes 3. As a result, a space between the pixel and common electrodes 7 and 3 is smallest at summits of the bending point of the pixel electrodes 7, and is greatest at opposite ends of the pixel electrodes 7. Hence, a field generated by application of a voltage across the pixel and common electrodes 7 and 3 would have an intensity increasing towards a summit of the bending point of the pixel electrodes 7 from opposite ends of the pixel electrodes 7.

Accordingly, a field would have a relatively great intensity in a region in which a space between the pixel and common electrodes 7 and 3 is relatively great, when a relatively high voltage is applied across the pixel and common electrodes 7 and 3, and would have a relatively great intensity in a region in which a space between the pixel and common electrodes 7 and 3 is relatively small, even when a relatively small voltage is applied across the pixel and common electrodes 7 and 3. As a result, it would be possible to cause liquid crystal in the liquid crystal layer 17 to quickly respond to a field, even when a voltage which is relatively small in a pixel is applied across the pixel and common electrodes 7 and 3.

The above-mentioned advantage is explained hereinbelow with reference to FIG. 7.

A relation between a voltage applied to the liquid crystal and a panel transmissivity in a region where a space between the pixel electrode 7 and the common electrode 3 is relatively great is indicated with a dotted line A. In the dotted line A, a panel transmissivity becomes maximum when a voltage to be applied to the liquid crystal is equal to a certain voltage which is relatively great. Since a field would have a high intensity in a region in the vicinity of a summit of the bending point of the pixel electrode 7, in which a space between the pixel electrode 7 and the common electrode 3 is smallest, even when the applied voltage is relatively small, it would be possible to shift a peak of a panel transmissivity towards a lower voltage to be applied to the liquid crystal, as indicated with a dotted line B.

By combining the dotted lines A and B with each other, a panel transmissivity could be made great even when an applied voltage is relatively small, as indicated with a broken line C.

In addition, with respect to a response speed, it would be possible to increase a response speed in a region in which a space between the pixel electrode 7 and the common electrode 3 is relatively small, even when a voltage applied to the liquid crystal is relatively small. Thus, a response in half tone display can be improved.

The improvement in a response speed in half tone display is explained hereinbelow with reference to FIG. 8.

In a conventional IPS liquid crystal display device in which he pixel electrodes 7 and the common electrodes 3 are equally spaced away from each other, a response speed is low when the applied voltage is relatively small, and gradually increases as the applied voltage increases, as indicated with a broken line D.

In contrast, in the IPS liquid crystal display device in accordance with the first embodiment, a response speed can be made high, even when the applied voltage is relatively low, as indicated with a solid line E. This shows improvement in a response speed in half tone display.

FIG. 9 is a graph showing a relation between a response speed and the applied voltage through the use of a difference between the bending angles of the pixel and common electrodes 7 and 3, as a parameter.

With reference to FIG. 9, the higher a response speed is, the greater the difference is. In particular, it is found out that when the difference is equal to or greater than 5 degrees, a response speed could be significantly improved.

As mentioned above, the greater the difference in the bending angle between the pixel and common electrodes 7 and 3 is, the higher the response speed is. However, if the difference were too great, the electrodes would occupy a remarkably large area in a pixel with the result of reduction in a numerical aperture. Hence, there exists a preferable range in the difference in the bending angle between the pixel and common electrodes 7 and 3.

For instance, in the first embodiment in which the smallest space between the pixel and common electrodes 7 and 3 is set equal to about 2 μm, and the greatest space between the pixel and common electrodes 7 and 3 is set equal to about 7 μm, a numerical aperture is gradually reduced, as the difference in the bending angle between the pixel and common electrodes 7 and 3 increases. However, when the difference is equal to or greater than 3 degrees, it would be possible to make a numerical aperture high, since a plurality of columns surrounded by the pixel and common electrodes 7 and 3 which make a pair can be formed in a pixel.

Accordingly, it is preferable that the difference in the bending angle between the pixel and common electrodes 7 and 3 is equal to or smaller than 12 degrees on the condition that a numerical aperture in the first embodiment is kept the same as a numerical aperture in the conventional liquid crystal display device.

If the pixel and common electrodes 7 and 3 are formed symmetry in shape with each other about the VB—VB line defined by connecting the bending points of the pixel and common electrodes 7 and 3, it would be possible to equalize a first area surrounded by the adjacent pixel and common electrodes 7 and 3 to a second area surrounded by the adjacent pixel and common electrodes 7 and 3 wherein a direction of a field in the first area is just opposite to a direction of a field in the second area. This ensures improvement in dependency on a visual angle in the liquid crystal display device in accordance with the first embodiment, similarly to a TN type liquid crystal display device having a multi-domain structure.

In the IPS type liquid crystal display device in accordance with the first embodiment, as illustrated in FIG. 6, since a field generated between the pixel and common electrodes 7 and 3 has an intensity and a direction both of which vary in dependence on a location, liquid crystal molecules can be twisted in any direction. Hence, the IPS type liquid crystal display device in accordance with the first embodiment makes it possible to significantly enhance a characteristic of a visual angle in comparison with a conventional liquid crystal display device in which a field has two directions, and to have no dependency on a direction.

As mentioned so far, the IPS type liquid crystal display device in accordance with the first embodiment makes it possible to form regions in which a field has a varying intensity, by varying the bending angles of the pixel and common electrodes 7 and 3 to thereby vary a space between the pixel and common electrodes 7 and 3 in a pixel. As a result, a response speed of liquid crystal can be enhanced even in half tone display in which a voltage to be applied to the liquid crystal is relatively small.

In addition, since a direction of a field can be varied in a pixel, the liquid crystal display device could have an improved characteristic of a visual angle, but had no dependency on a direction in viewing a display screen.

Though the pixel electrodes 7 are designed to have a greater bending angle than that of the common electrodes 3 in the first embodiment, the present invention is not to be limited to such arrangement. The liquid crystal display device may be designed to have any structure as long as a space between the pixel and common electrodes 7 and 3 can be varied in a pixel. For instance, the common electrodes 3 may be designed to have a greater bending angle than that of the pixel electrodes 7. As an alternative, a summit of the bending point of the pixel and/or common electrodes 7 and 3 may be designed to direct upwardly, downwardly, to the right, or to the left in FIG. 5A.

[Second Embodiment]

Hereinbelow is explained the IPS type liquid crystal display device in accordance with the second embodiment and a variant thereof with reference to FIGS. 10A and 10B.

Figure 10A:
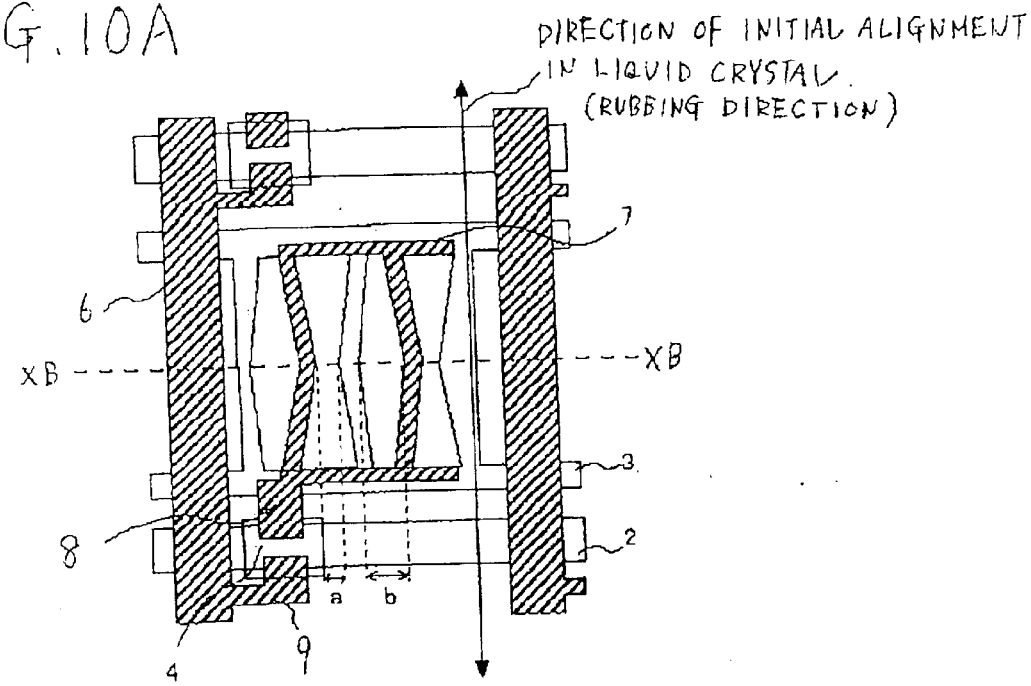
FIG. 10A is a plan view of a liquid crystal display device in accordance with the second embodiment of the present invention.
Figure 10B:
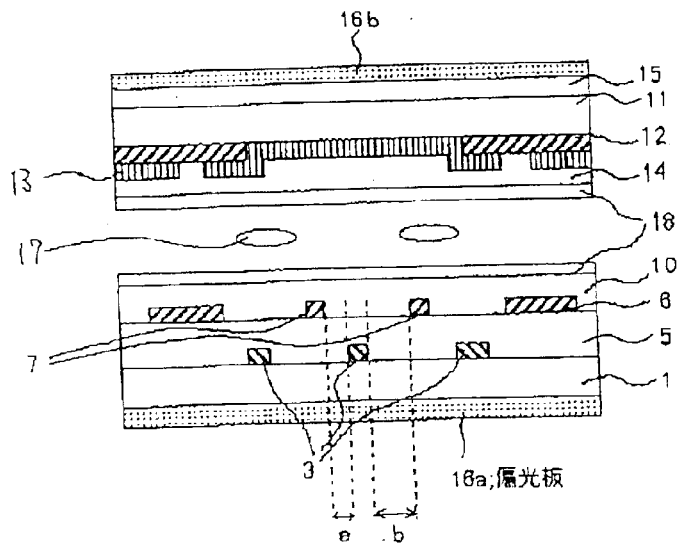
FIG. 10B is a cross-sectional view taken along the line XB—XB in FIG. 10A.

FIG. 10A is a plan view of the IPS type liquid crystal display device in accordance with the second embodiment, and FIG. 10B is a cross-sectional view taken along the line XB—XB in FIG. 10A.

The IPS type liquid crystal display device in accordance with the second embodiment is structurally different from the IPS type liquid crystal display device in accordance with the first embodiment only in shapes of the pixel and common electrodes.

In the above-mentioned first embodiment, the pixel and common electrodes 7 and 3 are designed to have the bending points having summits directing in the same direction, and a space between the pixel and common electrodes 7 and 3 is varied by changing the bending angles of the bending points.

In contrast, in the second embodiment, the pixel and common electrodes 7 and 3 are designed to have the bending points having summits directing in the opposite directions to each other. As a result, a space between the pixel and common electrodes 7 and 3 is smallest or greatest at a site where the summits of the bending points of the pixel and common electrodes 7 and 3 face each other, and a space between the pixel and common electrodes 7 and 3 is greatest or smallest at a site where the opposite ends of the pixel and common electrodes 7 and 3 face each other. Herein, the greatest space is set almost equal to a space between the pixel and common electrodes 7 and 3 in the conventional IPS type liquid crystal display device.

Accordingly, a field would have a relatively high intensity in a region where a space between the pixel and common electrodes 7 and 3 is relatively great, when a relatively high voltage is applied across the pixel and common electrodes 7 and 3, like the conventional IPS type liquid crystal display device, and would have a relatively high intensity in a region where a space between the pixel and common electrodes 7 and 3 is relatively small, even when a relatively small voltage is applied across the pixel and common electrodes 7 and 3. Thus, even when a voltage which is small for a pixel is applied across the pixel and common electrodes 7 and 3, it would be possible to cause liquid crystal in the liquid crystal layer 17 to quickly respond to a field.

The above-mentioned advantage is explained hereinbelow with reference to FIG. 7.

A relation between a voltage applied to the liquid crystal and a panel transmissivity in a region where a space between the pixel electrode 7 and the common electrode 3 is relatively great is indicated with a dotted line A. In the dotted line A, a panel transmissivity becomes maximum when a voltage to be applied to the liquid crystal is equal to a certain voltage which is relatively great. Since a field would have a high intensity in a region where the summits of the bending points face each other, and hence, the space between the pixel and common electrodes 7 and 3 is smallest, even when the applied voltage is relatively small, it would be possible to shift a peak of a panel transmissivity towards a lower voltage to be applied to the liquid crystal, as indicated with a dotted line B.

By combining the dotted lines A and B with each other, a panel transmissivity could be made great even when an applied voltage is relatively small, as indicated with a broken line C.

In addition, with respect to a response speed, it would be possible to increase a response speed in a region in which a space between the pixel electrode 7 and the common electrode 3 is relatively small, even when a voltage applied to the liquid crystal is relatively small. Thus, a response in half tone display can be improved.

If the pixel and common electrodes 7 and 3 are formed symmetry in shape with each other about the XB—XB line defined by connecting the bending points of the pixel and common electrodes 7 and 3, it would be possible to equalize a first area surrounded by the adjacent pixel and common electrodes 7 and 3 to a second area surrounded by the adjacent pixel and common electrodes 7 and 3 wherein a direction of a field in the first area is just opposite to a direction of a field in the second area. This ensures improvement in dependency on a visual angle in the liquid crystal display device in accordance with the first embodiment, similarly to a TN type liquid crystal display device having a multi-domain structure.

In the IPS type liquid crystal display device in accordance with the second embodiment, since a field generated between the pixel and common electrodes 7 and 3 has an intensity and a direction both of which vary in dependence on a location, liquid crystal molecules can be twisted in any direction. Hence, the IPS type liquid crystal display device in accordance with the second embodiment makes it possible to significantly enhance a characteristic of a visual angle in comparison with a conventional liquid crystal display device in which a field has two directions, and to have no dependency on a direction.

As mentioned so far, the IPS type liquid crystal display device in accordance with the second embodiment makes it possible to form regions in which a field has a varying intensity, by designing the summits of the bending points of the pixel and common electrodes 7 and 3 to direct in opposite directions to each other to thereby vary a space between the pixel and common electrodes 7 and 3 in a pixel. As a result, a response speed of liquid crystal can be enhanced even in half tone display in which a voltage to be applied to the liquid crystal is relatively small.

In addition, since a direction of a field can be varied in a pixel, the liquid crystal display device could have an improved characteristic of a visual angle, but had no dependency on a direction in viewing a display screen.

Though the pixel and common electrodes 7 and 3 are designed to have the same bending angle as each other in the second embodiment, they may be designed to have bending angles different from each other, even in which case, the advantages as mentioned above can be obtained.

Figure 11A:
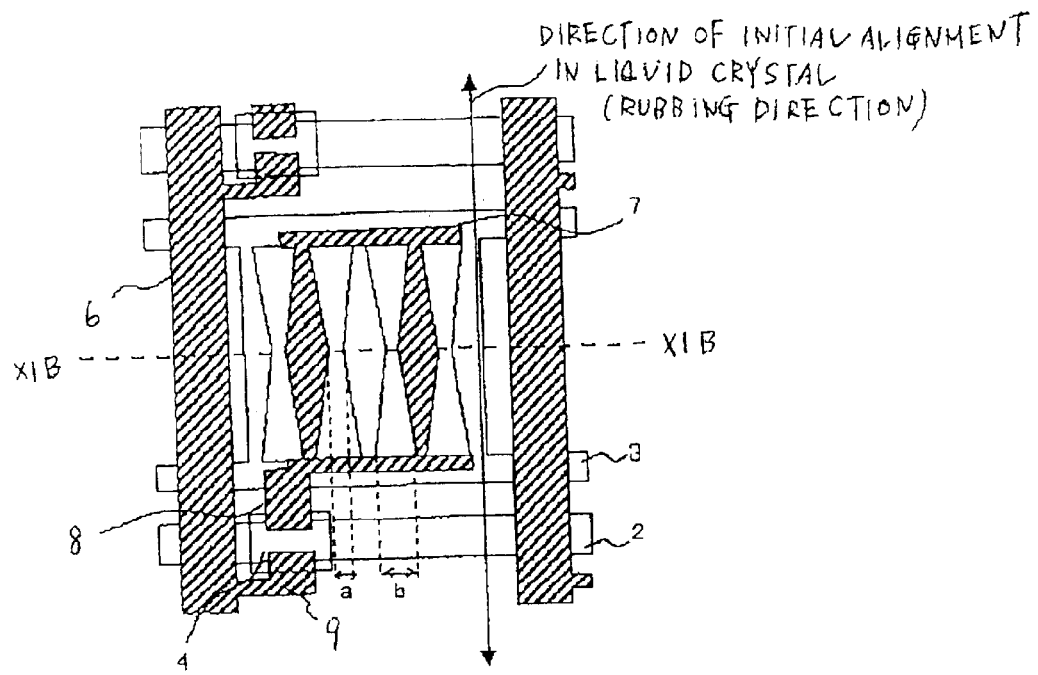
FIG. 11A is a plan view of a liquid crystal display device in accordance with a variant of the second embodiment.
Figure 11B:
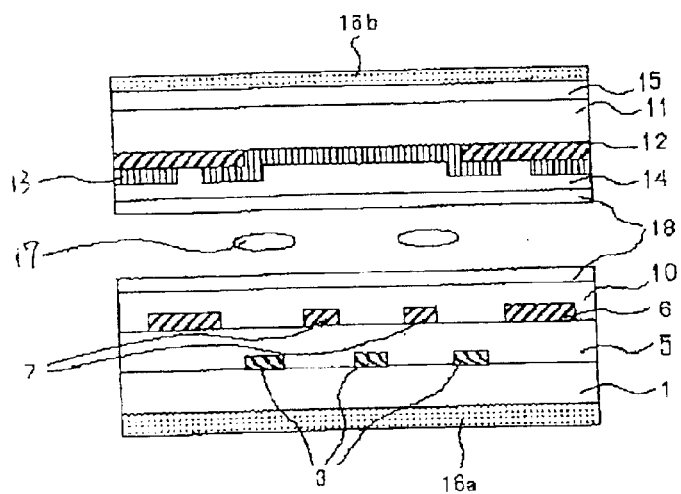
FIG. 11B is a cross-sectional view taken along the line XIB—XIB in FIG. 11A.

FIG. 11A is a plan view of the IPS type liquid crystal display device in accordance with a variant of the second embodiment, and FIG. 11B is a cross-sectional view taken along the line XIB—XIB in FIG. 11A.

As illustrated in FIG. 11A, the pixel and common electrodes 7 and 3 may be designed to have a varying width. Specifically, the pixel and common electrodes 7 and 3 may be designed to have a width which is greatest at a center in a length-wise direction, decreases towards opposite ends of the pixel and common electrodes 7 and 3, and is smallest at opposite ends of the pixel and common electrodes 7 and 3.

The variant illustrated in FIGS. 11A and 11B could provide the same advantages as those provided by the above-mentioned second embodiment.

Though not illustrated, the pixel and common electrodes 7 and 3 may be designed to have a width which is smallest at a center in a length-wise direction, increases towards opposite ends of the pixel and common electrodes 7 and 3, and is greatest at opposite ends of the pixel and common electrodes 7 and 3.

This variant would provide the same advantages as those provided by the above-mentioned second embodiment.

[Third Embodiment]

Figure 12A:
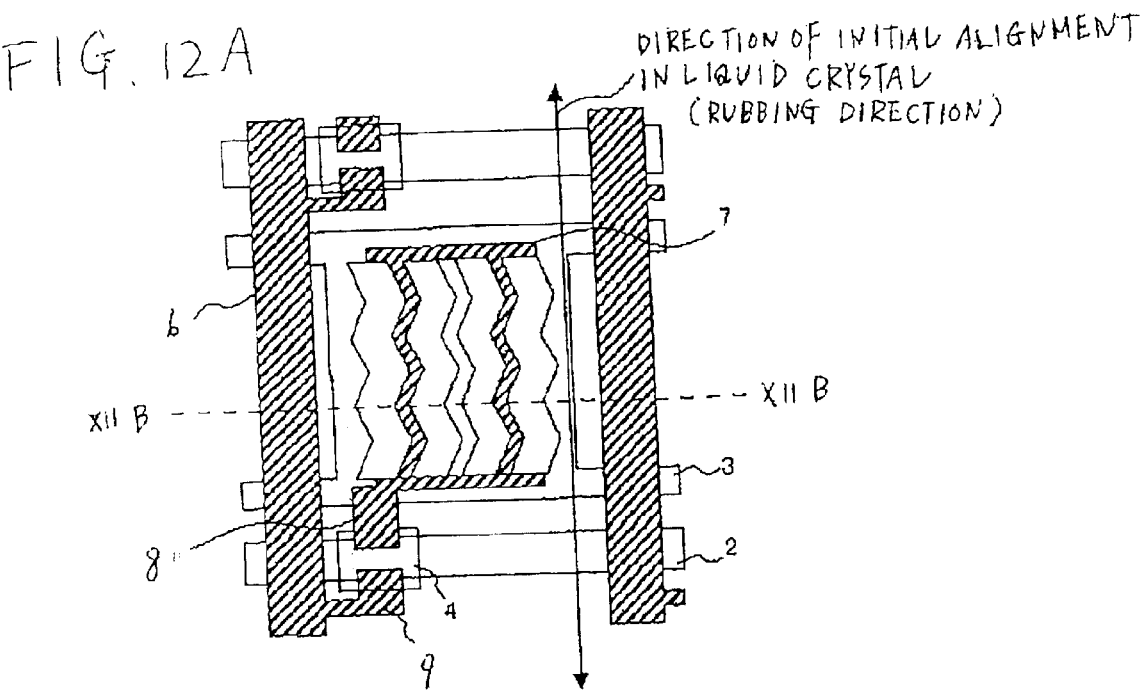
FIG. 12A is a plan view of a liquid crystal display device in accordance with the third embodiment of the present invention.
Figure 12B:
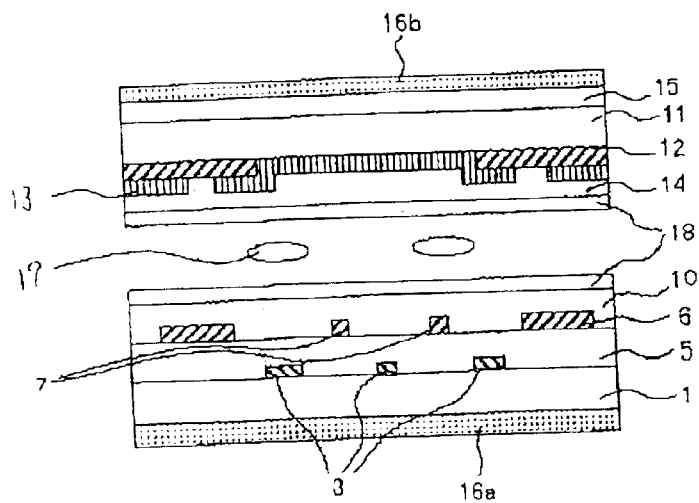
FIG. 12B is a cross-sectional view taken along the line XIIB—XIIB in FIG. 12A.

FIG. 12A is a plan view of the IPS type liquid crystal display device in accordance with the third embodiment, and FIG. 12B is a cross-sectional view taken along the line XIIB—XIIB in FIG. 12A.

Whereas the pixel and common electrodes 7 and 3 in the first and second embodiments are designed to have one bending point, the pixel and common electrodes 7 and 3 in the third embodiment are designed to have two or more bending points. Hence, the pixel and common electrodes 7 and 3 in the third embodiment are zigzag-shaped. The third embodiment can enhance a response speed of liquid crystal by virtue of elastic characteristic of liquid crystal. The IPS type liquid crystal display device in accordance with the third embodiment has the same structure as the structure of the IPS type liquid crystal display device in accordance with the first embodiment except the shapes of the pixel and common electrodes 7 and 3.

First, general behavior of liquid crystal is explained hereinbelow.

When a voltage is applied to liquid crystal, each liquid crystal molecules do not rotate independently of one another, but are influenced by one another due to elastic characteristic. Specifically, one liquid crystal molecule starts rotating, and the rest of liquid crystal molecules start rotating, following the one liquid crystal molecule, and resultingly, liquid crystal molecules are twisted as a group. Specifically, elastic forces are generated due to strain in expansion, twisting and bending in accordance with elastic coefficients K11, K22 and K33, respectively.

It is assumed hereinbelow that the liquid crystal having elastic characteristic behaves in the above-mentioned manner, for instance, in the liquid crystal display device in which the pixel and common electrodes 7 and 3 are designed to have bending points like the first embodiment.

While a voltage is applied across the pixel and common electrodes 7 and 3, liquid crystal molecules rotate in a first direction in one of two regions separated by the bending points of the pixel and common electrodes 7 and 3, and liquid crystal molecules rotate in a second direction in the other region. However, elastic force which return liquid crystal molecules back to its original alignment is exerted on liquid crystal molecules existing in the vicinity of the bending points of the pixel and common electrodes 7 and 3. The elastic force more quickly rotates the liquid crystal molecules and returns them back to their original alignment than a liquid crystal display device including pixel and common electrodes both being in the form of an elongate bar, when application of a voltage across the pixel and common electrodes is stopped.

That is, the pixel and common electrodes having a bending point could ensure a higher response speed of liquid crystal than a response speed in a liquid crystal display device including bar-shaped pixel and common electrodes. In addition, the pixel and common electrodes having the greater number of bending points could ensure a higher response speed of liquid crystal.

Accordingly, the pixel and common electrodes 7 and 3 in the third embodiment are designed to be zigzag-shaped in place of having one bending point. The zigzag-shaped pixel and common electrodes 7 and 3 have a plurality of bending points. Such a plurality of bending points ensures that elastic force such as the above-mentioned one is generated in the vicinity of each of the bending points, and hence, liquid crystal molecules are returned back to their original alignment rapidly. As a result, a response speed of liquid crystal can be increased. This advantage can be obtained in particular when a display screen displays black.

It is preferable for the pixel and common electrodes 7 and 3 to have the bending points as much as possible in order to increase a response speed. On the other hand, since the electrodes having a plurality of the bending points would occupy a large area in a pixel, the optimal number of bending points has to be determined in accordance with a specification required in a liquid crystal display device.

In order to compensate for a characteristic of a visual angle by forming areas which are separated by the bending points and in which a field has different directions to each other, it would be necessary to form such areas in pairs. Hence the number of such areas is preferably even, and the number of the bending points is preferably odd.

In accordance with the third embodiment, by designing the pixel and common electrodes 7 and 3 to have a plurality of bending points, preferably, M bending points, wherein M is an odd integer equal to or greater than 5, it would be possible for liquid crystal molecules to return back to their original alignment by virtue of elastic force of liquid crystal molecules, when no voltage is applied across the pixel and common electrodes 7 and 3. As a result, it would be possible to increase a response speed of liquid crystal molecules.

In addition, since a direction of a field can be varied differently in a column, the liquid crystal display device could have improved characteristic of a visual angle.

Though the pixel and common electrodes 7 and 3 are designed to have the same shape as each other in the third embodiment, the present invention is not to be limited to the third embodiment. The first embodiment in which one of the pixel and common electrodes 7 and 3 has a greater bending angle than the other, and/or the second embodiment in which the pixel and common electrodes 7 and 3 have summits directing in opposite directions to each other may be applied to the third embodiment, in which case, it would be possible to enhance a response speed of liquid crystal in half tone display.

[Fourth Embodiment]

Figure 13A:
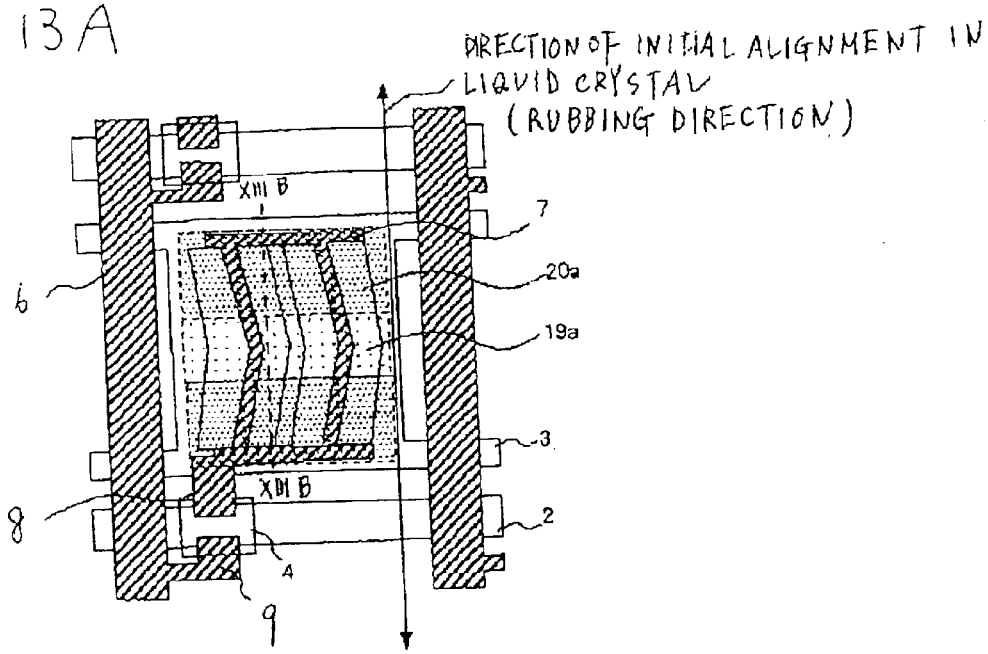
FIG. 13A is a plan view of a liquid crystal display device in accordance with the fourth embodiment of the present invention.
Figure 13B:
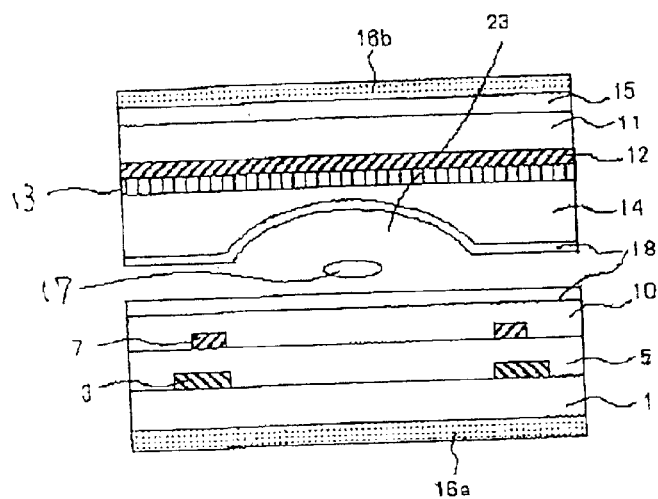
FIG. 13B is a cross-sectional view taken along the line XIIIB—XIIIB in FIG. 13A.
Figure 14A:
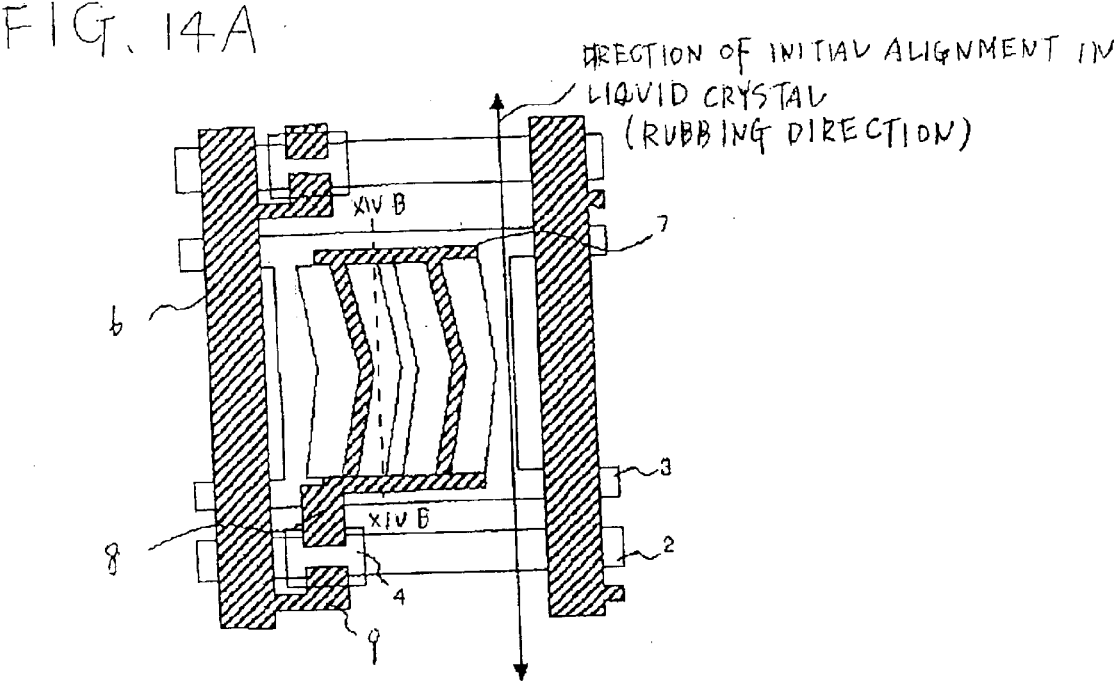
FIG. 14A is a plan view of a liquid crystal display device in accordance with a variant of the fourth embodiment.
Figure 14B:
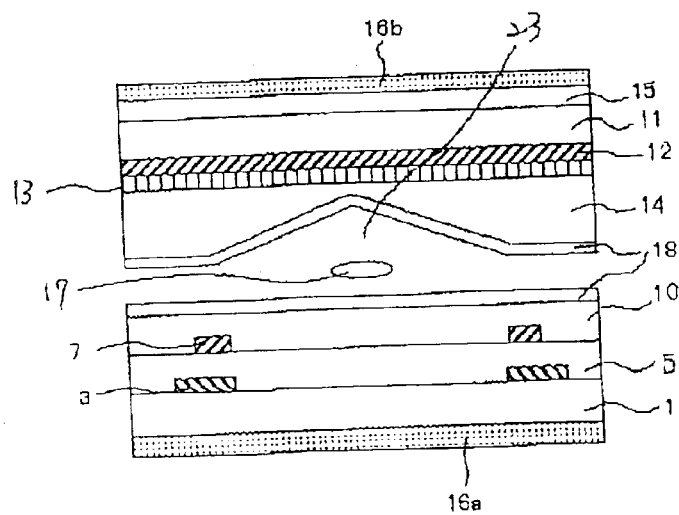
FIG. 14B is a cross-sectional view taken along the line XIVB—XIVB in FIG. 14A.
Figure 15:
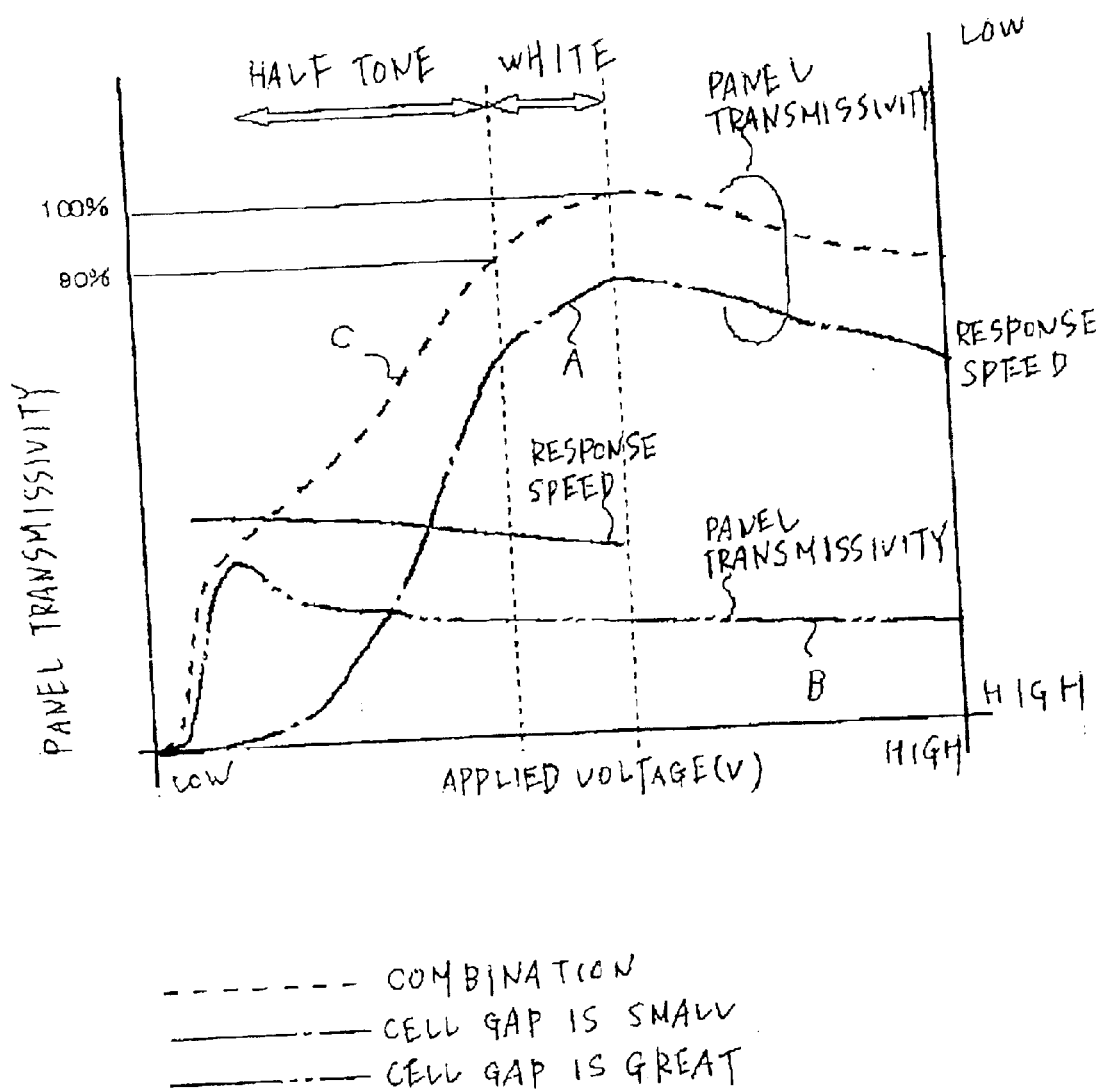
FIG. 15 illustrates a relation between an applied voltage and both a panel transmissivity and a response of liquid crystal in the liquid crystal display device in accordance with the fourth embodiment of the present invention.
Figure 16A:
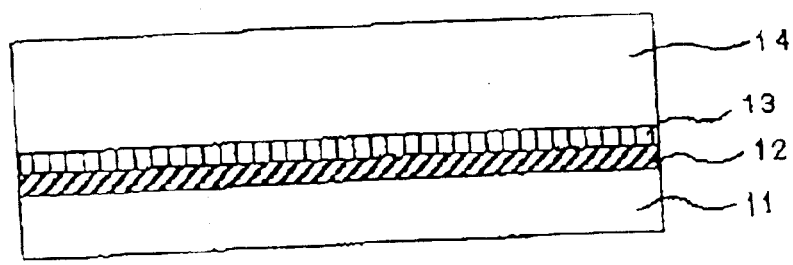
FIGS. 16A to 16C illustrate cross-sectional views of the liquid crystal display device in accordance with the fourth embodiment of the present invention, showing respective steps of a method of fabricating the same.
Figure 16B:
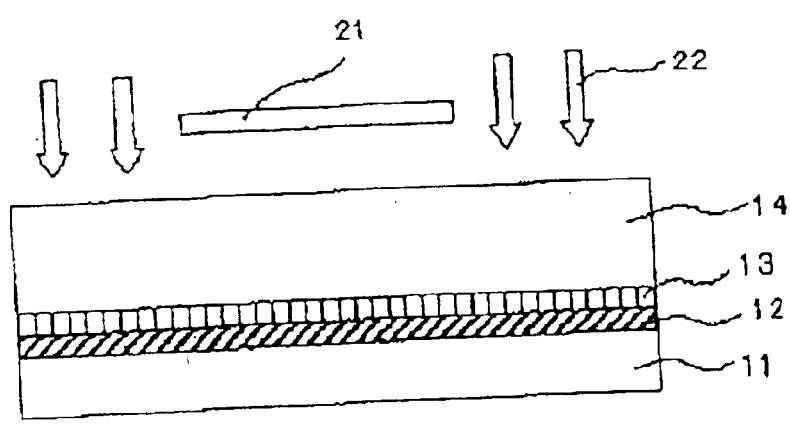
Figure 16C:
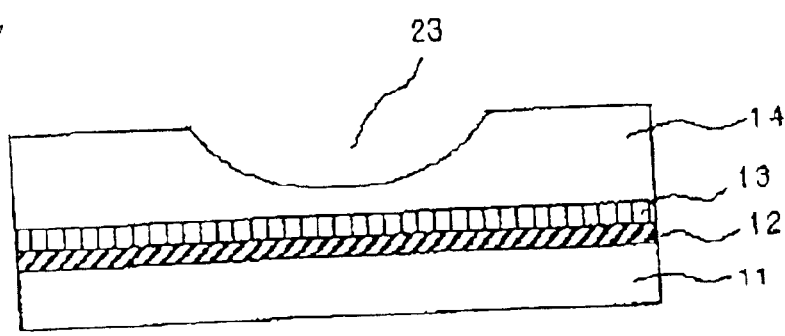

FIG. 13A is a plan view of a liquid crystal display device in accordance with the fourth embodiment of the present invention, and FIG. 13B is a cross-sectional view taken along the line XIIIB—XIIIB in FIG. 13A. FIG. 14A is a plan view of a liquid crystal display device in accordance with a variant of the fourth embodiment of the present invention, and FIG. 14B is a cross-sectional view taken along the line XIVB—XIVB in FIG. 14A. FIG. 15 illustrates a relation between an applied voltage and both a panel transmissivity and a response of liquid crystal in the liquid crystal display device in accordance with the fourth embodiment, and FIGS. 16A to 16C illustrate cross-sectional views of the liquid crystal display device in accordance with the fourth embodiment, showing respective steps of a method of fabricating the same.

In accordance with the fourth embodiment, a cell gap, that is, a thickness of the liquid crystal layer 17 is varied, in place of varying a space between the pixel and common electrodes 7 and 3, in order to increase a response speed of liquid crystal in half tone display.

The IPS type liquid crystal display device in accordance with the fourth embodiment is comprised of a first transparent substrate 1 on which a thin film transistor (TFT) is to be fabricated, a second transparent substrate 11, and a liquid crystal layer 17 sandwiched between the first and second transparent substrates 1 and 11.

Gate electrodes 2 and data lines 6 are formed on the first transparent substrate 1 such that they are substantially perpendicular to each other. TFTs 4 are arranged in a matrix at intersections of the gate electrodes 2 and the data lines 6. Adjacent gate electrodes 2 spaced away from and in parallel with each other, adjacent data lines 6 spaced away from and in parallel with each other, and TFT 4 define one pixel.

In each of pixels, pixel electrodes 7 and common electrodes 3 are formed. Both the pixel electrodes 7 and the common electrodes 3 have a bending point at which they are bent in the form of ">". However, the pixel electrodes 7 and the common electrodes 3 may be designed to be in the form of a bar. The pixel electrodes 7 are electrically connected to a source electrode 8 of TPT 4, and the common electrodes 3 are electrically connected to a common electrode line (not illustrated) extending in parallel with the gate electrodes 2.

As illustrated in FIG. 13B, the common electrodes 3 and the gate electrodes 2 are formed directly on the first transparent substrate 1. An interlayer insulating film 5 is formed on the first transparent substrate 1, covering the common electrodes 3 and the gate electrodes 2 therewith. The pixel electrodes 7 and the data lines 6 are formed on the interlayer insulating film 5. A passivation film 10 is formed on the interlayer insulating film 5, covering the pixel electrodes 7 therewith. An alignment film 18 is formed on the passivation film 10.

A first polarizing plate 16a is adhered to a lower surface of the first transparent substrate 1.

On the second transparent substrate 11 are formed a black matrix layer 12 preventing a light from reaching the gate electrodes 2, the data lines 6, and a region between a pixel display area and both the gate electrodes 2 and the data lines 6, a color layer 13 for displaying red, green and blue (RGB) colors, a planarizing film 14 covering the black matrix layer 12 and the color layer 13 therewith and having a planarized surface, and an alignment film 18, in this order.

An electrically conductive layer 15 and a second polarizing plate 16b are formed on an upper surface of the second transparent substrate 11 in this order.

Liquid crystal in the liquid crystal layer 17 sandwiched between the first and second transparent substrates 1 and 11 is homogeneously aligned substantially in parallel with a direction in which the data lines 6 extend.

The first and second polarizing plates 16a and 16b have polarizing axes perpendicular to each other. One of the polarizing axes is set to be in parallel with a direction in which the liquid crystal is aligned.

In the fourth embodiment, the planarizing film 14 is formed with a recess 23 having an arcuate cross-section. The recess 23 extends in a direction in which the gate electrodes 2 extend, passing through a center of a pixel. Since the recess 23 is arcuate in a cross-section, the recess 23 has a varying depth. As a result, a cell gap between the first and second transparent substrates 1 and 11 varies in accordance with a depth of the recess 23.

Hereinbelow is explained a relation between the cell gap and a response speed of liquid crystal.

As indicated in the equation (1), a threshold voltage Vth which is a minimum voltage for driving liquid crystal is in inverse proportion to the cell gap "d", and hence, if the cell gap "d" becomes greater, the threshold voltage Vth becomes smaller. If the threshold voltage Vth becomes smaller, liquid crystal can be made to rotate at a low voltage, which means that a response speed of liquid crystal is increased in half tone display. Thus, it is possible to increase a response speed of liquid crystal by varying the cell gap as well as by varying a space between the pixel and common electrodes 7 and 3.

In the fourth embodiment, a first region 19a in which the cell gap is relatively great extends in a direction in which the gate electrodes 2 extend, passing through a center of a pixel, and second regions 20a in which the cell gap is relatively small extend in the same direction as the first region 19a, sandwiching the first region 19a therebetween, as illustrated in FIG. 13A.

Hereinbelow is explained a method of forming the second transparent substrate 11 with the recess 23, with reference to FIGS. 16A to 16C.

First, as illustrated in FIG. 16A, the black matrix layer 12 and the color layer 13 are formed on the second transparent substrate 11 in a predetermined region. Then, the planarizing film 14 is formed covering the black matrix layer 12 and the color layer 13 therewith. The planarizing film 14 is composed of a material which will be cured when ultra-violet ray is radiated thereto, such as resist or polyimide, and has a predetermined thickness and a planarized surface.

Then, as illustrated in FIG. 16B, a mask 21 is set above the planarizing film 14 such that ultra-violet ray 22 is not radiated to a region in which the recess 23 is to be formed. The mask 21 is comprised of an ultra-violet ray cutting filter, for instance.

Then, the ultra-violet ray 33 is radiated to the planarizing film 14. The planarizing film 14 is cured in a first region in which the ultra-violet ray 22 was radiated, and is not cured in a second region covered with the mask 21.

Then, the planarizing film 14 is etched through the use of a predetermined developing agent. As a result, as illustrated in FIG. 16C, the planarizing film 14 is etched more deeply in the second region than in the first region, thereby the recess 23 having an arcuate cross-section is formed.

A cross-section of the recess 23 can be controlled by optimizing radiation of the ultra-violet ray 22 and developing and etching conditions. For instance, the recess 23 may be designed to have a V-shaped cross-section, as illustrated in FIG. 14B.

The advantage obtained by the recess 23 is explained hereinbelow with reference to FIG. 15.

A relation between a voltage applied to the liquid crystal and a panel transmissivity in a region where the cell gap between the pixel electrode 7 and the common electrode 3 is relatively small is indicated with a dotted line A. Since liquid crystal molecules can be made to readily rotate in a region where the cell gap is relatively great due to the recess 23, a peak of a panel transmissivity is shifted towards a lower voltage to be applied to the liquid crystal, as indicated with a dotted line B.

By combining the dotted lines A and B with each other, a panel transmissivity could be made great even when an applied voltage is relatively small, as indicated with a broken line C.

In addition, with respect to a response speed of liquid crystal, it would be possible to increase a response speed in a region in which the cell gap is relatively great, even when a voltage applied to the liquid crystal is relatively small. Thus, a response of liquid crystal molecules in half tone display can be improved.

As mentioned above, the IPS type liquid crystal display device in accordance with the fourth embodiment is designed to have the recess 23 in the planarizing film 14 to thereby have a varying cell gap in a pixel. Hence, since the threshold voltage Vth can be successively varied in accordance with the equation (1), it would be possible to increase a response speed of liquid crystal even in half tone display where a small voltage is applied to the liquid crystal. That is, the fourth embodiment can provide the same advantages as those obtained by the fist or second embodiment in which a space between the pixel and common electrodes 7 and 3 varies.

Though the recess 23 in the fourth embodiment is designed to have an arcuate or V-shaped cross-section, the recess 23 is not to be limited to those, The recess 23 may have any cross-section as long as the cell gap varies in a pixel. Accordingly, the recess 23 may be designed to have a U-shaped, trapezoidal or rectangular cross-section.

In the fourth embodiment, since the alignment film 18 is formed along the recess 23, a material of which the alignment film 18 is composed may be pooled in the recess 23, if the material does not have a sufficiently high viscosity. Hence, it is preferable that the alignment film 18 is composed of a material having a viscosity equal to or greater than 30 cp. In addition, the alignment film 18 is formed preferably by off-set printing.

[Fifth Embodiment]

Figure 17A:
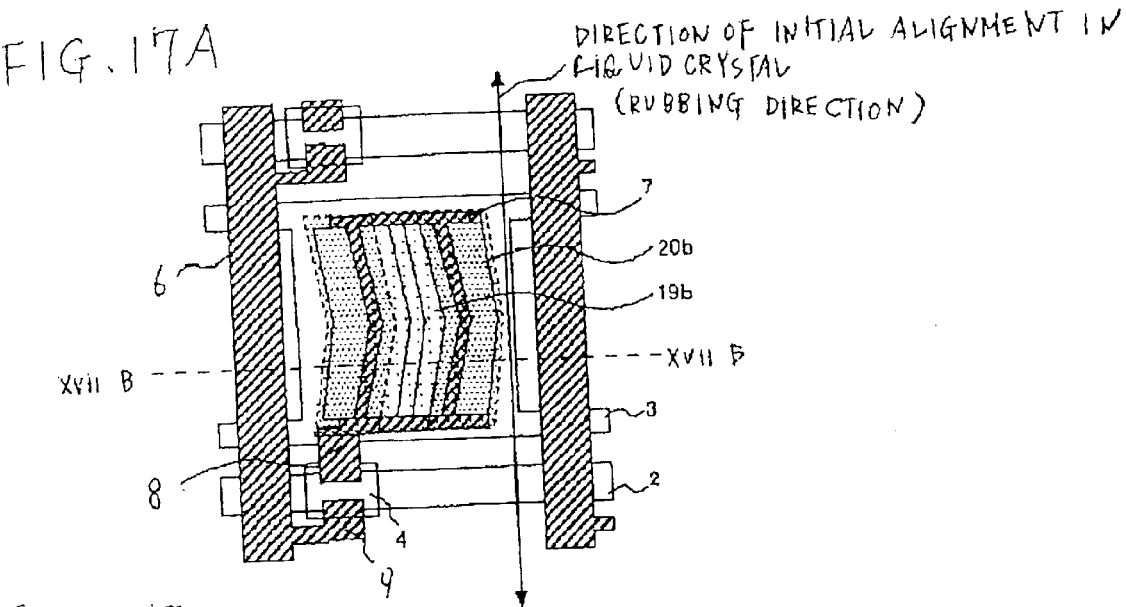
FIG. 17A is a plan view of a liquid crystal display device in accordance with the fifth embodiment of the present invention.
Figure 17B:
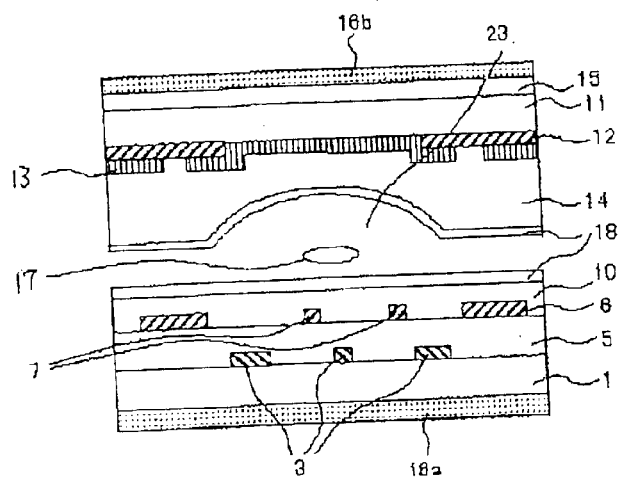
FIG. 17B is a cross-sectional view taken along the line XVIIB—XVIIB in FIG. 17A.
Figure 18A:
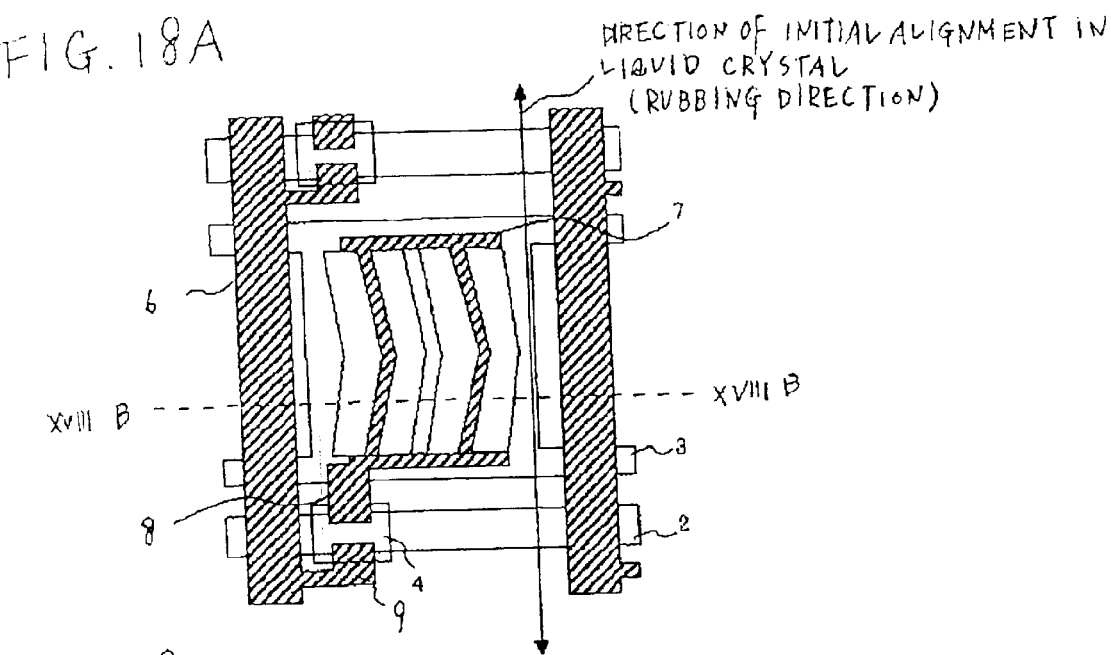
FIG. 18A is a plan view of a liquid crystal display device in accordance with a variant of the fifth embodiment.
Figure 18B:
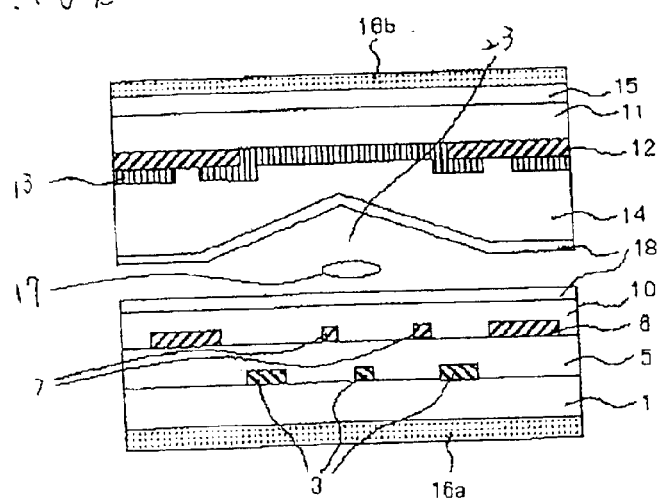
FIG. 18B is a cross-sectional view taken along the line XVIIIB—XVIIIB in FIG. 18A.

FIG. 17A is a plan view of a liquid crystal display device in accordance with the fifth embodiment of the present invention, and FIG. 17B is a cross-sectional view taken along the line XVIIB—XVITB in FIG. 17A. FIG. 18A is a plan view of a liquid crystal display device in accordance with a variant of the fifth embodiment of the present invention, and FIG. 18B is a cross-sectional view taken along the line XVIIIB—XVIIIB in FIG. 18A.

The IPS type liquid crystal display device in accordance with the fifth embodiment is structurally different from the IPS type liquid crystal display device in accordance with the fourth embodiment only in that the recess 23 extends in a direction in which the data lines 6 extend, whereas the recess 23 in the fourth embodiment extends in a direction in which the gate electrodes 2 extend.

On the second transparent substrate 11 are formed the black matrix layer 12, the color layer 13 and the planarizing film 14 in this order. The planarizing film 14 is formed with the recess 23 having a semi-circular (see FIG. 17B) or V-shaped (see FIG. 18B) cross-section, and extending in a direction in which the data lines 6 extend. The recess 23 is formed such that a summit of the recess 23 at which the cell gap is greatest extends along the pixel or common electrode 7 or 3. In the fifth embodiment, the summit extends along the centrally located common electrode 3.

Since the recess 23 has a semi-circular or V-shaped cross-section, the recess 23 has a varying depth which ensures that the cell gap between the first and second transparent substrates 1 and 11 varies in the recess 23. As a result, the threshold voltage Vth is lowered in a region in which the cell gap is relatively great, ensuring a quick response of liquid crystal.

Hence, a first region 19b in which the cell gap is relatively great is formed along the centrally located common electrode 3, and second regions 20b are formed so that they sandwich the first region 19b therebetween. In the second regions 20b, the cell gap becomes smaller at a location closer to the data lines 6.

In the second regions 20b, a relation between the applied voltage and a panel transmissivity is the same as the corresponding relation in the first embodiment in which a space between the pixel and common electrodes 7 and 3 is relatively great. In contrast, since liquid crystal molecules can be made to readily rotate in the fist region 19b where the cell gap is relatively great due to the recess 23, a peak of a panel transmissivity is shifted towards a lower voltage to be applied to the liquid crystal. Thus, a panel transmissivity could be made great entirely in a pixel, even when an applied voltage is relatively small.

In addition, with respect to a response speed of liquid crystal, it would be possible to increase a response speed in a region in which the cell gap is relatively great, even when a voltage applied to the liquid crystal is relatively small, because liquid crystal molecules can be made to rotate readily. Thus, a response of liquid crystal molecules in half tone display can be improved.

In the fifth embodiment, the pixel and common electrodes 7 and 3 may be designed to have a bending point or be in the form of a bar having no bending points, similarly to the fourth embodiment. In addition, the recess 23 may be designed to have a U-shaped, trapezoidal or rectangular cross-section, similarly to the fourth embodiment.

[Sixth Embodiment]

Figure 19A:
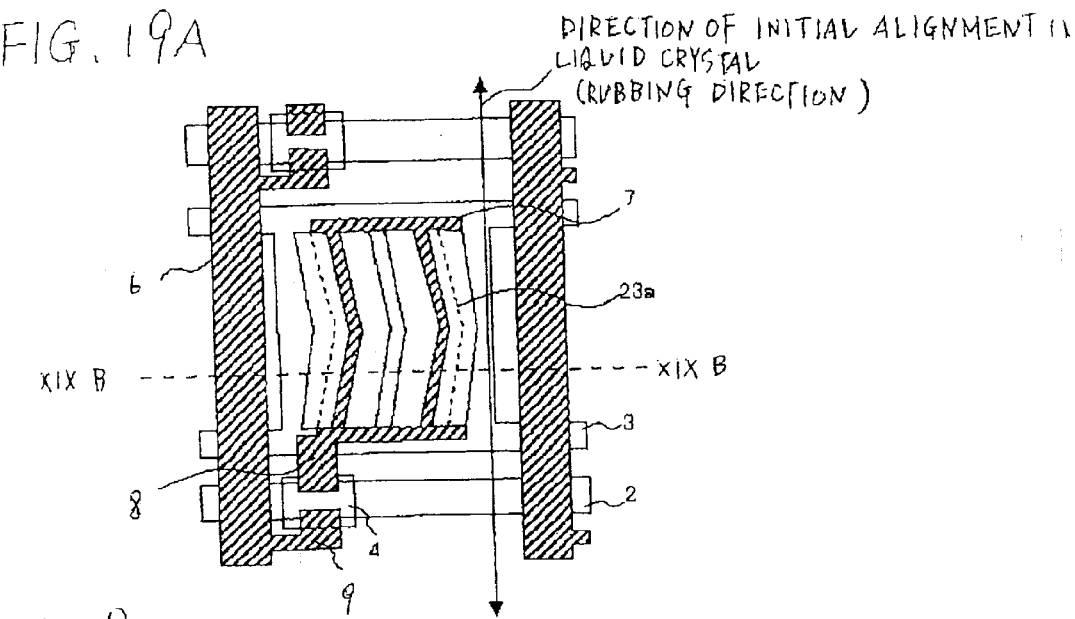
FIG. 19A is a plan view of a liquid crystal display device in accordance with the sixth embodiment of the present invention.
Figure 19B:
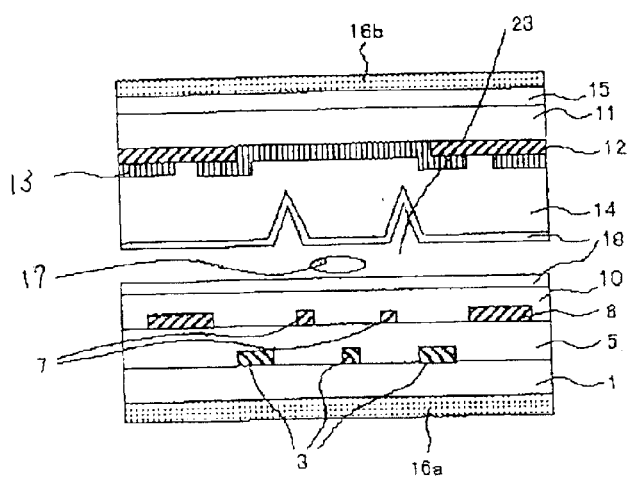
FIG. 19B is a cross-sectional view taken along the line XIXB—XIXB in FIG. 19A
Figure 20:
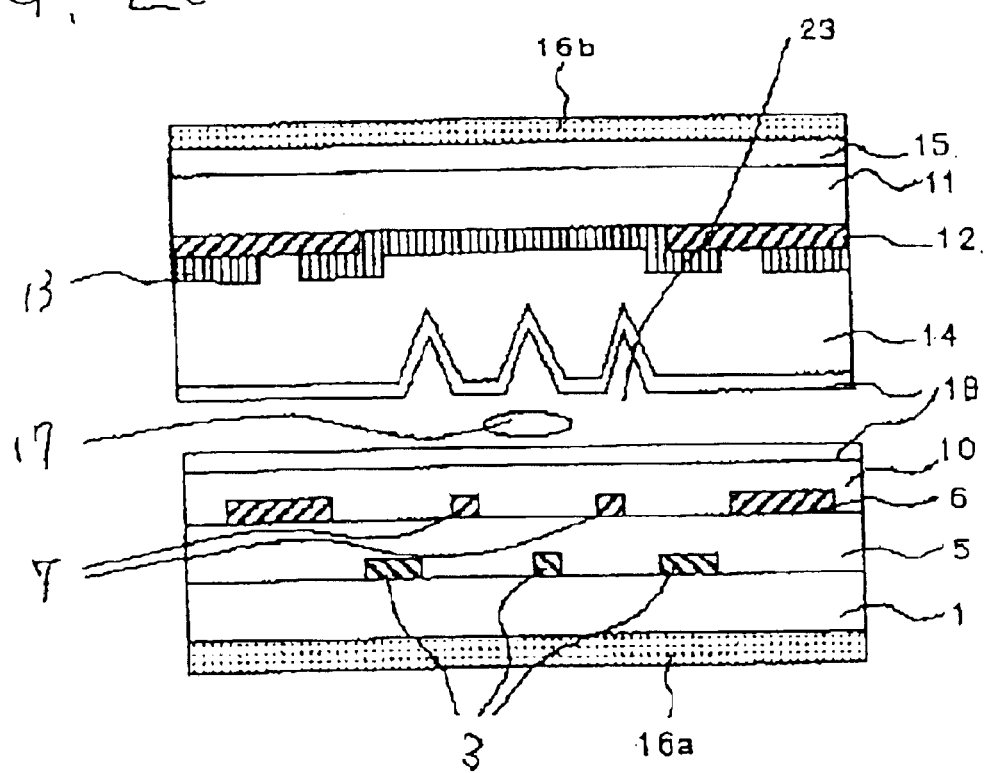
FIG. 20 is a plan view of a liquid crystal display device in accordance with a variant of the sixth embodiment.

FIG. 19A is a plan view of a liquid crystal display device in accordance with the sixth embodiment of the present invention, and FIG. 19B is a cross-sectional view taken along the line XIXB—XIXB in FIG. 19A. FIG. 20 is a plan view of a liquid crystal display device in accordance with a variant of the sixth embodiment of the present invention.

The IPS type liquid crystal display device in accordance with the sixth embodiment is structurally different from the IPS type liquid crystal display device in accordance with the fifth embodiment only in including a plurality of the recesses 23, whereas the IPS type liquid crystal display device in accordance with the fifth embodiment includes only one recess 23.

In the sixth embodiment, the planarizing film 14 is formed with a plurality of the recesses 23 having a V-shaped cross-section. The recesses 23 extend in a direction in which the data lines 6 extend, and summits of the recesses 23 extend in parallel with the pixel and common electrodes 7 and 3.

Since the recesses 23 have a V-shaped cross-section, each of the recesses 23 has a varying depth. Hence, the cell gap between the first and second transparent substrates 1 and 11 also varies. The threshold voltage Vth can be lowered in a region where the cell gap is relatively great, and hence, a response speed of liquid crystal can be increased.

In the sixth embodiment, summits 23a of the recesses 23 are positioned in the middle between the pixel electrodes 7 and the common electrodes 3 located outside the pixel electrodes 7 such that the cell gap is greatest in the vicinity of the summits 23a and the cell gap becomes smaller at a location closer to the pixel electrodes 7 or the data lines 6.

By forming the recesses 23, it would be possible to form a region in which the cell gap is relatively great, and hence, liquid crystal can be made to readily rotate. Hence, it would be possible to enhance a panel transmissivity, and hence, a response speed in the region, even when a voltage applied to the liquid crystal is relatively small, ensuring improvement in half tone display.

Though the recesses 23 in the sixth embodiment are designed to have a V-shaped cross-section, the recesses 23 may be designed to have a semi-circular, U-shaped, trapezoidal or rectangular cross-section.

Though the liquid crystal display device in accordance with the sixth embodiment is designed to have two V-shaped recesses 23, the number of the recesses 23 is not to be limited to two. For instance, as illustrated in FIG. 20, the liquid crystal display device may be designed to have three or more recesses 23, in which case, each of the recesses 23 may be designed to have a depth and/or a cross-section both different from a depth and/or a cross-section of other recesses.

[Seventh Embodiment]

Figure 21A:
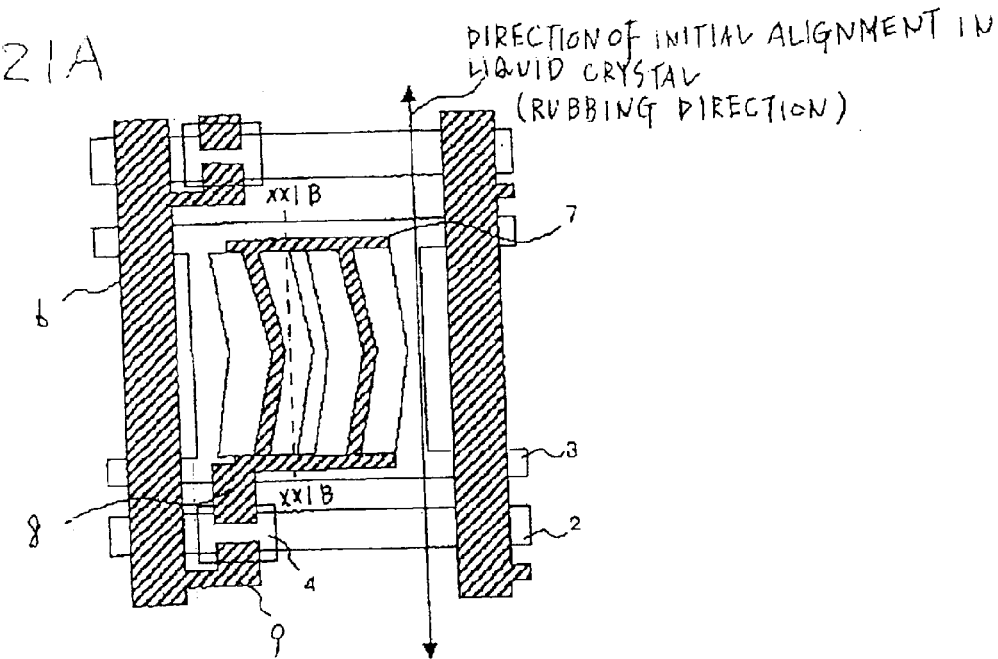
FIG. 21A is a plan view of a liquid crystal display device in accordance with the seventh embodiment of the present invention.
Figure 21B:
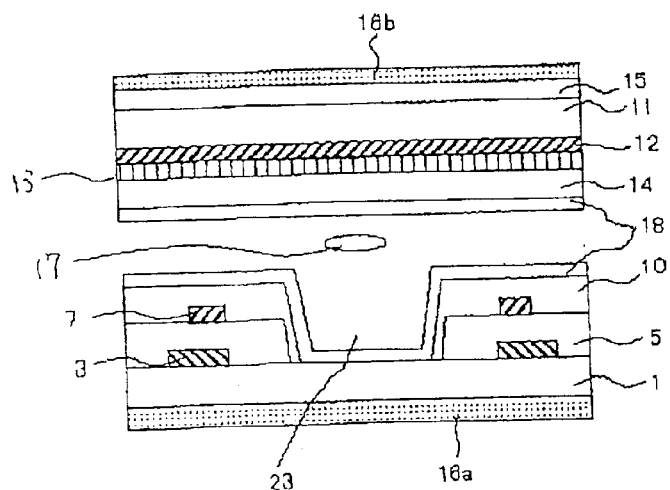
FIG. 21B is a cross-sectional view taken along the line XXIB—XXIB in FIG. 21A.

FIG. 21A is a plan view of a liquid crystal display device in accordance with the seventh embodiment of the present invention, and FIG. 21B is a cross-sectional view taken along the line XXIB—XXIB in FIG. 21A.

The IPS type liquid crystal display device in accordance with the seventh embodiment is structurally different from the IPS type liquid crystal display device in accordance with the fourth to sixth embodiments only in that the first transparent substrate 1 is formed with the recess 23.

In the seventh embodiment, the recess 23 is formed throughout the interlayer insulating film 5 and the passivation film 10, as illustrated in FIG. 21B.

Hereinbelow is explained a method of forming the first transparent substrate 1 with the recess 23.

First, the gate electrodes 2 and the common electrodes 3 are formed on the first transparent substrate 1.

Then, the interlayer insulating film 6 is formed on the first transparent substrate 1, covering the gate electrodes 2 and the common electrodes 3 therewith.

Then, a resist is formed on the interlayer insulating film 5 in a predetermined pattern. Then, the interlayer insulating film 5 is dry or wet etched with the resist pattern being used as a mask, to thereby remove the interlayer insulating film 5 in a selected region.

Then, the data lines 6 and pixel electrodes 7 are formed on the interlayer insulating film 5. Then, the passivation film 10 is formed on the interlayer insulating film 5, covering the data lines 6 and pixel electrodes 7 therewith.

Then, the passivation film 10 is dry or wet etched for removal in the region where the interlayer insulating film 5 has been removed, to thereby form the recess 23.

Then, the alignment film 18 is formed both on the passivation film 10 and the exposed first transparent substrate 1.

By designing the recess 23 to have a varying depth to thereby vary the cell gap between the first and second transparent substrates 1 and 11, it would be possible to lower the threshold voltage Vth in a region where the cell gap is relatively great, to thereby increase a response speed of liquid crystal.

By forming the recesses 23, it would be possible to form a region in which the cell gap is relatively great, and hence, liquid crystal can be made to readily rotate. Thus, a peak of the panel transmissivity can be shifted towards a lower voltage. As a result, it would be possible to enhance the panel transmissivity, and hence, a response speed in the region, even when a voltage applied to the liquid crystal is relatively small, ensuring improvement in half tone display.

In the seventh embodiment, both the interlayer insulating film 5 and the passivation film 10 are removed for forming the recess 23 at the first transparent substrate 1. However, the recess 23 may be formed in different ways.

Figure 22A:
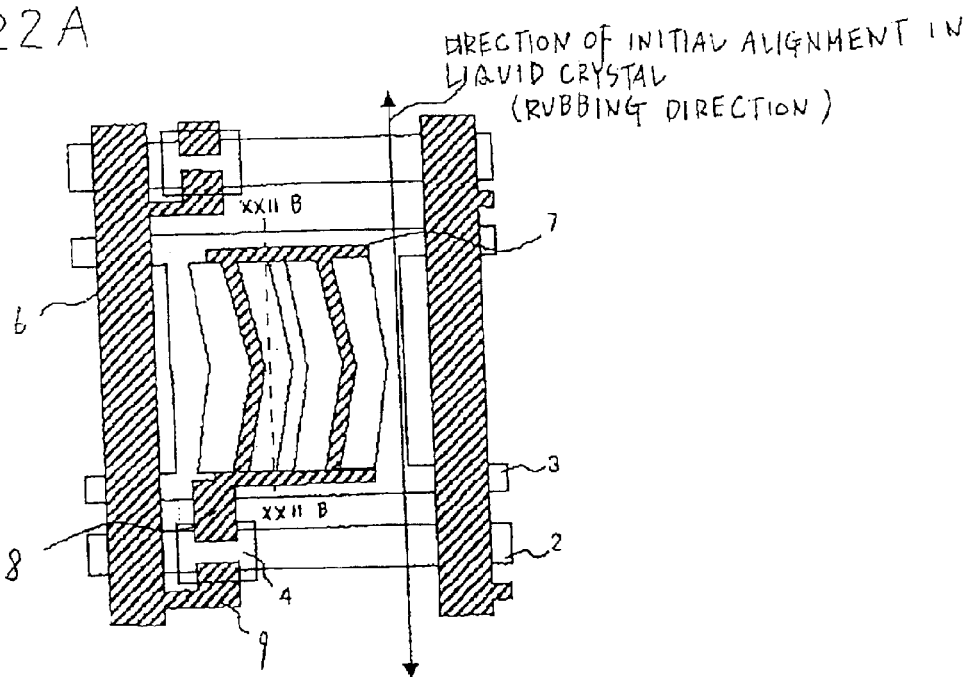
FIG. 22A is a plan view of a liquid crystal display device in accordance with a variant of the seventh embodiment.
Figure 22B:
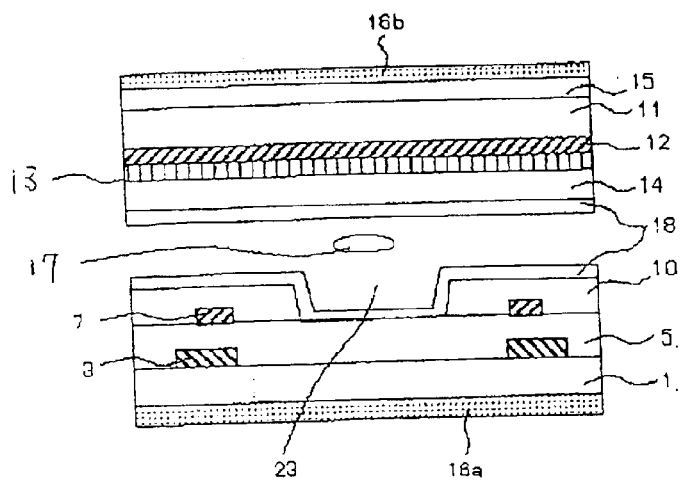
FIG. 22B is a cross-sectional view taken along the line XXIIB—XXIIB in FIG. 22A.

For instance, as illustrated in FIGS. 22A and 22B, only the passivation film 10 may be removed for forming the recess 23.

As an alternative, after the passivation film 10 has been formed, both the passivation film 10 and the interlayer insulating film 5 may be simultaneously removed for forming the recess 23.

As an alternative, only the interlayer insulating film 6 may be removed so that a resultant recess reflects the passivation film 10 for forming the recess 23.

[Eighth Embodiment]

Figure 23A:
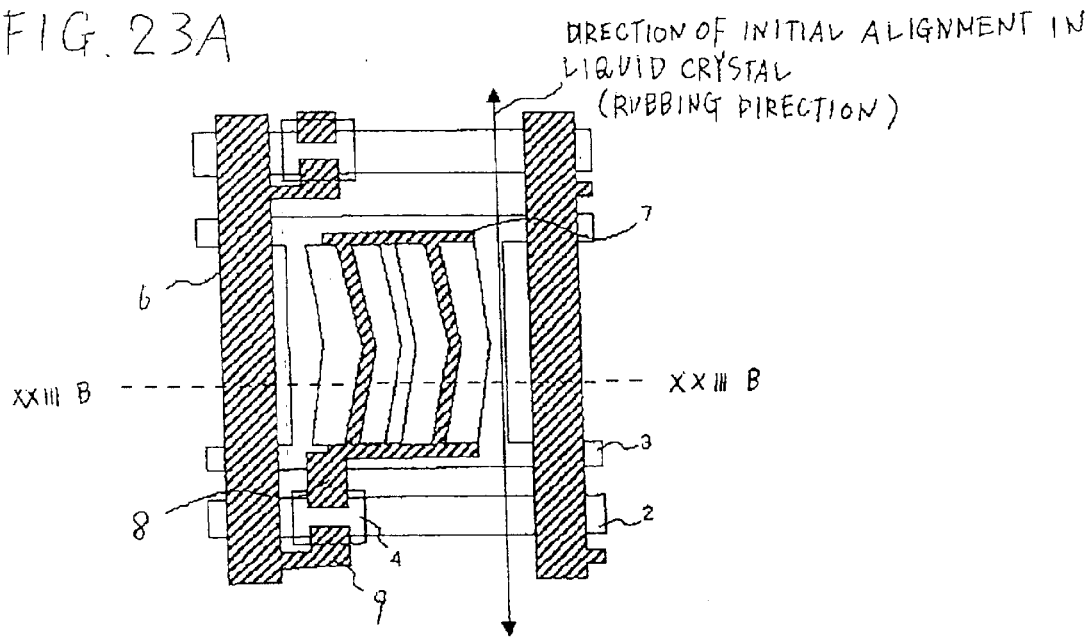
FIG. 23A is a plan view of a liquid crystal display device in accordance with the eighth embodiment of the present invention.
Figure 23B:
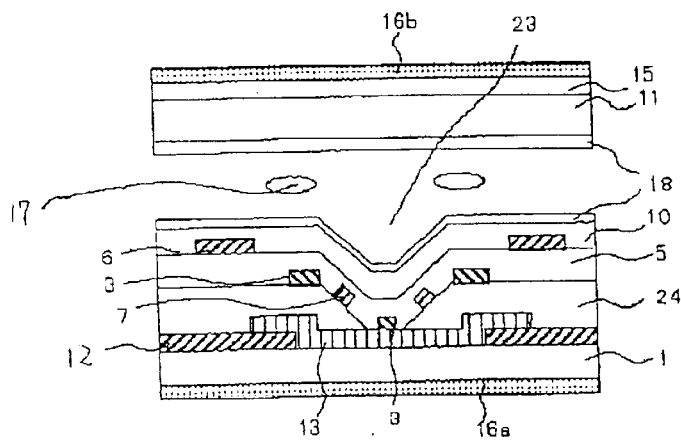
FIG. 23B is a cross-sectional view taken along the line XXIIIB—XXIIIB in FIG. 23A.

FIG. 23A is a plan view of a liquid crystal display device in accordance with the eighth embodiment of the present invention, and FIG. 23B is a cross-sectional view taken along the line XXIIIB—XXIIIB in FIG. 23A.

The IPS type liquid crystal display device in accordance with the eighth embodiment is structurally different from the IPS type liquid crystal display device in accordance with the fourth to seventh embodiments in that the black matrix layer 12 and the color layer 13 are formed on the first transparent substrate 1, and the first transparent substrate 1 is formed with the recess 23.

On the first transparent substrate 1 are formed the black matrix layer 12, the color layer 13 and an organic interlayer insulating film 24 in this order. Then, the organic interlayer insulating film 24 is etched to thereby form the recess 23. Then, the pixel and common electrodes 7 and 3 are formed on the organic interlayer insulating film 24. Then, the interlayer insulating film 5 is formed on the organic interlayer insulating film 24, covering the pixel and common electrodes 7 and 3 therewith. Then, the data lines 6 are formed on the interlayer insulating film 5. Then, the passivation film 10 is formed on the interlayer insulating film 5, covering the data lines 6 therewith. Then, the alignment film 18 is formed on the passivation film 10.

On the second transparent substrate 11 is formed only the alignment film 18. The liquid crystal layer 17 is sandwiched between the alignment films 18.

In the IPS type liquid crystal display device, since the black matrix layer 12 is formed on the first transparent substrate 1 on which the pixel and common electrodes 7 and 3 are also formed, it would be possible to keep a positional relation accurate among the black matrix layer 12, the gate electrodes 2, the data lines 6 and the common electrodes 3. Accordingly, since they can be arranged with reduction in a margin, it would be possible to enhance a numerical aperture.

As mentioned above, in accordance with the eighth embodiment, the recess 23 is formed along the centrally located common electrode 3. The cell gap is greater at a location closer to the centrally located common electrode 3, and is smaller at a location closer to the data lines 6. Since liquid crystal molecules can be made to rotate readily in a region where the cell gap is relatively great, it would be possible to enhance the panel transmissivity, and hence, a response speed in the region, even when a voltage applied to the liquid crystal is relatively small, ensuring improvement in half tone display.

In addition, since the black matrix 12 and the electrodes 7 and 3 are formed on the same substrate, a positional relation among them can be kept accurate, and a numerical aperture can be enhanced.

[Ninth Embodiment]

FIG. 24A is a plan view of a liquid crystal display device in accordance with the ninth embodiment of the present invention, and FIG. 24B is a cross-sectional view taken along the line XXIVB—XXIVB in FIG. 24A.

The IPS type liquid crystal display device in accordance with the ninth embodiment is characterized in that the black matrix layer 12 and the color layer 13 are formed on the first transparent substrate 1, and the first transparent substrate 1 is formed with the recess 23, similarly to the above-mentioned eighth embodiment. However, a method of forming the pixel electrodes 7, a cross-section of the recess 23, and a method of forming the recess 23 in the ninth embodiment are different from those in the eighth embodiment.

On the first transparent substrate 1 are formed the black matrix layer 12 and the color layer 13 such that the black matrix layer 12 is formed with an opening, and the opening is filled with the color layer 13.

Then, as illustrated in FIG. 24B, the color layer 13 is partially removed to thereby form a plurality of holes. Then, the pixel and common electrodes 7 and 3 are formed to fill the holes therewith. As a result, the pixel and common electrodes 7 and 3 are formed in the same layer as the black matrix layer 12.

Then, the organic interlayer insulating film 24 is formed on the black matrix layer 12, the color layer 13, the pixel electrode 7 and the common electrode 3. At this stage, since the pixel and common electrodes 7 and 3 have a thickness smaller than a thickness of the color layer 13, there are formed steps between the color layer 13 and the pixel and common electrodes 7 and 3. The steps are reflected in the organic interlayer insulating film 24, and as a result, recesses are formed at a surface of the organic interlayer insulating film 24 in reflection with the steps.

Then, the gate electrodes 2 and the common electrodes 3 located outside in a pixel are formed on the organic interlayer insulating film 24. Thereafter, the interlayer insulating film 5 is formed on the organic interlayer insulating film 24, covering the gate electrodes 2 and the common electrodes 3 therewith.

Then, the data lines 6 are formed on the interlayer insulating film 5. Then, the passivation film 10 is formed on the interlayer insulating film 5, covering the data lines 6 therewith.

Since the above-mentioned steps are reflected in both the interlayer insulating film 6 and the passivation film 10, the interlayer insulating film 5 and the passivation film 10 are successively formed with the recesses 23.

Then, the alignment film 18 is formed on the passivation film 10.

On the second transparent substrate 11 is formed only the alignment film 18. The liquid crystal layer 17 is sandwiched between the alignment films 18.

In the IPS type liquid crystal display device in accordance with the ninth embodiment, since the black matrix layer 12 and the color layer 13 are formed on the first transparent substrate 1 on which the pixel and common electrodes 7 and 3 are also formed, it would be possible to keep a positional relation accurate among the black matrix layer 12, the color layer 13, the gate electrodes 2, the data lines 6 and the pixel and common electrodes 7 and 3. Accordingly, since they can be arranged with reduction in a margin, it would be possible to enhance a numerical aperture.

In addition, since the cell gap is automatically formed along the steps formed between the color layer 13 and the pixel and common electrodes 7 and 3, it would be possible to accurately control a positional relationship between the recesses 23 and the pixel and common electrodes 7 and 3.

In accordance with the ninth embodiment, the cell gap is great along the pixel and common electrodes 7 and 3, and the cell gap is small in other regions. Hence, it would be possible to enhance the panel transmissivity, and hence, a response speed, even when a voltage applied to the liquid crystal is relatively small, ensuring improvement in half tone display, similarly to the liquid crystal display device in which a space between the pixel and common electrodes 7 and 3 varies.

Though the steps formed between the color layer 13 and the pixel and common electrodes 7 and 3 are reflected in the organic interlayer insulating layer 24, the interlayer insulating film 6 and the passivation film 10, the organic interlayer insulating film 24 may be formed with the recesses independently of the steps. Similarly, the interlayer insulating film 5 and/or the passivation film 10 may be formed with recesses independently of the steps.

[Tenth Embodiment]

Figure 25A:
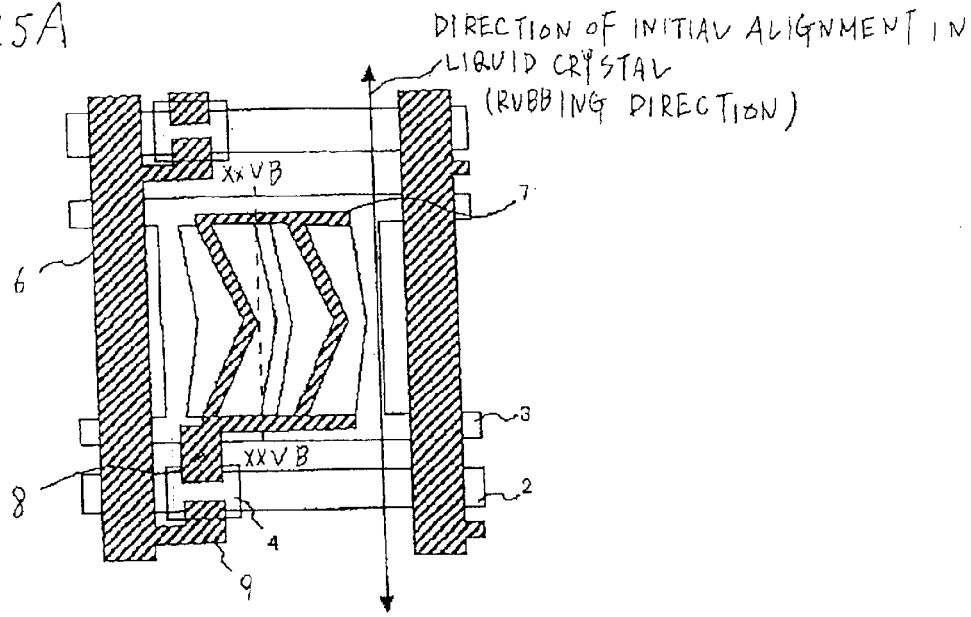
FIG. 25A is a plan view of a liquid crystal display device in accordance with the tenth embodiment of the present invention.
Figure 25B:
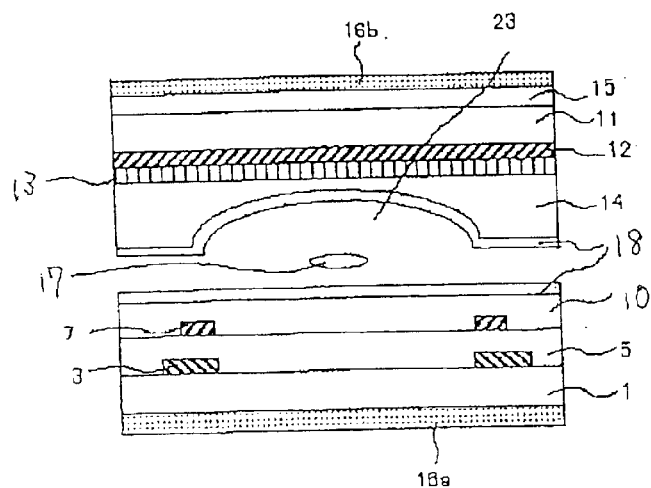
FIG. 25B is a cross-sectional view taken along the line XXVB—XXVB in FIG. 25A.

FIG. 25A is a plan view of a liquid crystal display device in accordance with the tenth embodiment of the present invention, and FIG. 25B is a cross-sectional view taken along the line XXVB—XXVB in FIG. 25A.

The tenth embodiment is comprised of a combination of the first to third embodiments in which a space between the pixel and common electrodes varies, and the fourth to ninth embodiments in which the first or second transparent substrate is formed with the recess to thereby vary the cell gap.

The gate electrodes 2 and the data lines 6 are formed on the first transparent substrate 1 such that they are perpendicular to each other. Thin film transistors (TFTS) 4 are arranged in a matrix at intersections of the gate electrodes 2 and the data lines 6. The adjacent data lines 6 and the adjacent gate electrodes 2 define a pixel therein. In each of pixels, there are formed the pixel and common electrodes 7 and 3 both having a bending point at which the pixel and common electrodes 7 and 3 are bend. The pixel and common electrodes 7 and 3 have bending angles different from each other to thereby vary a space between the pixel and common electrodes 7 and 3.

As illustrated in FIG. 25B, the common electrodes 3 and the gate electrodes 2 are formed directly on the first transparent substrate 1. An interlayer insulating film 5 is formed on the first transparent substrate 1, covering the common electrodes 3 and the gate electrodes 2 therewith. The pixel electrodes 7 and the data lines 6 are formed on the interlayer insulating film 5. A passivation film 10 is formed on the interlayer insulating film 5, covering the pixel electrodes 7 therewith. An alignment film 18 is formed on the passivation film 10.

A first polarizing plate 16a is adhered to a lower surface of the first transparent substrate 1.

On the second transparent substrate 11 are formed a black matrix layer 12 preventing a light from reaching the gate electrodes 2, the data lines 6, and a region between a pixel display area and both the gate electrodes 2 and the data lines 6, a color layer 13 for displaying red, green and blue (RGB) colors, a planarizing film 14 covering the black matrix layer 12 and the color layer 13 therewith and having a planarized surface, and an alignment film 18, in this order.

The planarizing film 14 is formed with the recess 23 having an arcuate cross-section. The recess 23 is designed to extend in a direction in which the gate electrodes 2 extend.

Since the recess 23 has a varying depth, the cell gap between the first and second transparent substrates 1 and 11 varies.

In the tenth embodiment, the pixel electrode 7 is designed to have a greater bending angle than that of the common electrode 3. Thus, a field would have a greater intensity at a location closer to a summit of the bending point. Accordingly, by designing the liquid crystal display device to have such a structure that a field would have a high intensity in a region where a space between the pixel and common electrodes 7 and 3 is relatively great, when a high voltage is applied across the pixel and common electrodes 7 and 3, and would have a high intensity in a region where a space between the pixel and common electrodes 7 and 3 is relatively small, even when a low voltage is applied across the pixel and common electrodes 7 and 3, it would be possible to enhance a panel transmissivity, and hence, a response speed of liquid crystal, even when a small voltage is applied.

In addition, a first region in which the cell gap is relatively great is formed in a direction in which the gate electrodes 2 extend, passing through a center of a pixel, and second regions are formed surrounding the first region. In the second region, the cell gap becomes smaller at a location closer to the gate electrodes 2. Thus, it would be possible to enhance a panel transmissivity, and hence, a response speed of liquid crystal in the first region.

A combination of the above-mentioned pixel and common electrodes 7 and 3 both having a bending point, and the recess 23 formed in the second transparent substrate 11 could further improve half tone display.

Though the tenth embodiment is comprised of a combination of the first and fourth embodiments, the pixel and common electrodes 7 and 3 described in one of the first to third embodiments may be combined with the recess 23 described in one of the fourth to ninth embodiments.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-203559 filed on Jul. 5, 2000 including specification, claims, drawings and summary is incorporated herein by reference in its entirety.

What is claimed is:

1. An in-plane switching type liquid crystal display device comprising:
   (a) a first substrate on which a plurality of gate lines and a plurality of data lines are formed such that said gate lines are substantially perpendicular to said data lines, and on which at least one pixel electrode and at least one common electrode are alternately formed in each of pixels defined by said gate and data lines;
   (b) a second substrate facing said first substrate; and
   (c) a liquid crystal layer sandwiched between said first and second substrates,
   wherein when a voltage is applied across said pixel electrode and said common electrode, liquid crystal existing on extensions of said data lines are caused to rotate in a plane substantially in parallel with said first substrate,
   both said pixel electrode and said common electrode have at least one bending point at which said pixel electrode and said common electrode bend,
   both said pixel electrode and said common electrode are inclined from an initial direction of liquid crystal,
   said pixel electrode and said common electrode are shaped in the form of "<" such that said pixel and common electrodes are not parallel with each other, and
   both said pixel electrode and said common electrode are designed to bend such that both an intensity and a direction of a field generated by said voltage successively vary.

2. The in-plane switching type liquid crystal display device as set forth in claim 1, wherein said pixel electrode and said common electrode are symmetrical in shape with each other about an axis extending through a center of said pixel in parallel with said gate line, and regions surrounded by said pixel and common electrodes located adjacent to each other have the same area.

3. An in-plane switching type liquid crystal display device comprising:
   (a) a first substrate on which a plurality of gate lines and a plurality of data lines are formed such that said gate lines are substantially perpendicular to said data lines, and on which at least one pixel electrode and at least one common electrode are alternately formed in each of pixels defined by said gate and data lines;
   (b) a second substrate facing said first substrate; and
   (c) a liquid crystal layer sandwiched between said first and second substrates,
   wherein when a voltage is applied across said pixel electrode and said common electrode, liquid crystal existing on extensions of said data lines are caused to rotate in a plane substantially in parallel with said first substrate,
   both said pixel electrode and said common electrode have at least one bending point at which said pixel electrode and said common electrode bend by first and second bending angles, respectively,
   both said pixel electrode and said common electrode are inclined from an initial direction of liquid crystal,
   said pixel electrode and said common electrode are shaped in the form of "<" such that said pixel and common electrodes are not parallel with each other, and
   said first bending angle is different from said second bending angle.

4. The in-plane switching type liquid crystal display device as set forth in claim 3, wherein said first bending angle is different from said second bending angle by five degrees or greater.

5. The in-plane switching type liquid crystal display device as set forth in claim 3, wherein said pixel electrode and said common electrode are symmetrical in shape with each other about an axis extending through a center of said pixel in parallel with said gate line, and regions surrounded by said pixel and common electrodes located adjacent to each other have the same area.

* * * * *